(12) United States Patent
Grossman

(10) Patent No.: US 7,980,975 B2
(45) Date of Patent: Jul. 19, 2011

(54) DRIVE CONFIGURATION AND METHOD THEREOF

(76) Inventor: Victor A. Grossman, Staten Island, NY (US)

(*) Notice: Subject to any disclaimer, the term of this patent is extended or adjusted under 35 U.S.C. 154(b) by 0 days.

(21) Appl. No.: 11/985,695

(22) Filed: Nov. 16, 2007

(65) Prior Publication Data
US 2009/0131207 A1    May 21, 2009

(51) Int. Cl.
*F16H 7/00*    (2006.01)
*B25B 27/14*    (2006.01)
(52) U.S. Cl. ... 474/87; 29/281.5; 123/90.27; 123/90.31; 123/198 C
(58) Field of Classification Search ........... 474/87; 29/281.5; 123/90.27, 90.31, 198 C
See application file for complete search history.

(56) References Cited

U.S. PATENT DOCUMENTS

| | | | |
|---|---|---|---|
| 1,061,098 A | | 5/1913 | McKeen |
| 2,305,787 A | | 9/1938 | Kales |
| 3,338,104 A | * | 8/1967 | Drain .............................. 74/3.52 |
| 4,459,123 A | * | 7/1984 | Tatsunaka et al. ............... 474/87 |
| 5,014,655 A | * | 5/1991 | Ampferer .................. 123/90.31 |
| 5,120,278 A | | 6/1992 | Trzmiel |
| 5,216,989 A | * | 6/1993 | Iwata et al. ................ 123/90.31 |
| 5,525,185 A | * | 6/1996 | Holbrook et al. ........... 156/441.5 |
| 6,109,227 A | * | 8/2000 | Mott .......................... 123/90.31 |
| 6,112,152 A | * | 8/2000 | Tuttle ............................. 701/115 |
| 6,763,792 B2 | | 7/2004 | Okamoto |
| 6,943,672 B2 | | 9/2005 | Choi |
| 7,228,829 B1 | | 6/2007 | Louie |
| 7,255,085 B2 | | 8/2007 | Shin |
| 7,263,958 B2 | | 9/2007 | Miyazaki |
| 2003/0109342 A1 | * | 6/2003 | Oliver et al. ................... 474/134 |
| 2006/0135302 A1 | * | 6/2006 | Manfredotti et al. ........... 474/87 |
| 2007/0155558 A1 | | 7/2007 | Horst et al. |
| 2007/0178999 A1 | * | 8/2007 | Wilson et al. ................... 474/87 |
| 2007/0249445 A1 | | 10/2007 | Hirata et al. |

FOREIGN PATENT DOCUMENTS

| | | |
|---|---|---|
| WO | WO 92/01879 | 2/1992 |
| WO | WO 93/17226 | 9/1993 |
| WO | WO 00/70240 | 11/2000 |

* cited by examiner

*Primary Examiner* — Bradley T King
*Assistant Examiner* — Mahbubur Rashid
(74) *Attorney, Agent, or Firm* — Zaretsky Patent Group PC; Howard Zaretsky

(57) ABSTRACT

A drive configuration for driving one or more rotating sprockets (e.g., of an engine drive train), including a flexible force transmitting member forming a closed curve enclosing an area; a drive sprocket situated outside the area and driving the force transmitting member; first and second pulleys situated at least partially within the area and on opposing sides of the drive sprocket so as to urge the force transmitting member against the drive sprocket; and one or more driven sprockets each coupled to the force transmitting member. The drive configuration may include a cartridge including a base, one or more secondary pulleys being situated on opposing sides of the first pulley such that a timing belt is urged into contact with a drive sprocket and each of the pulleys. Accordingly, a timing belt may be rapidly installed or removed by inserting or removing the cartridge according to the present invention.

28 Claims, 14 Drawing Sheets

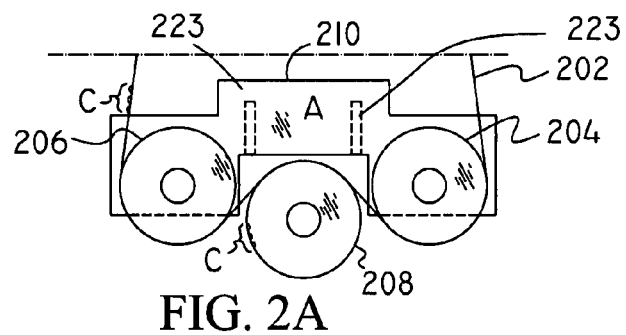
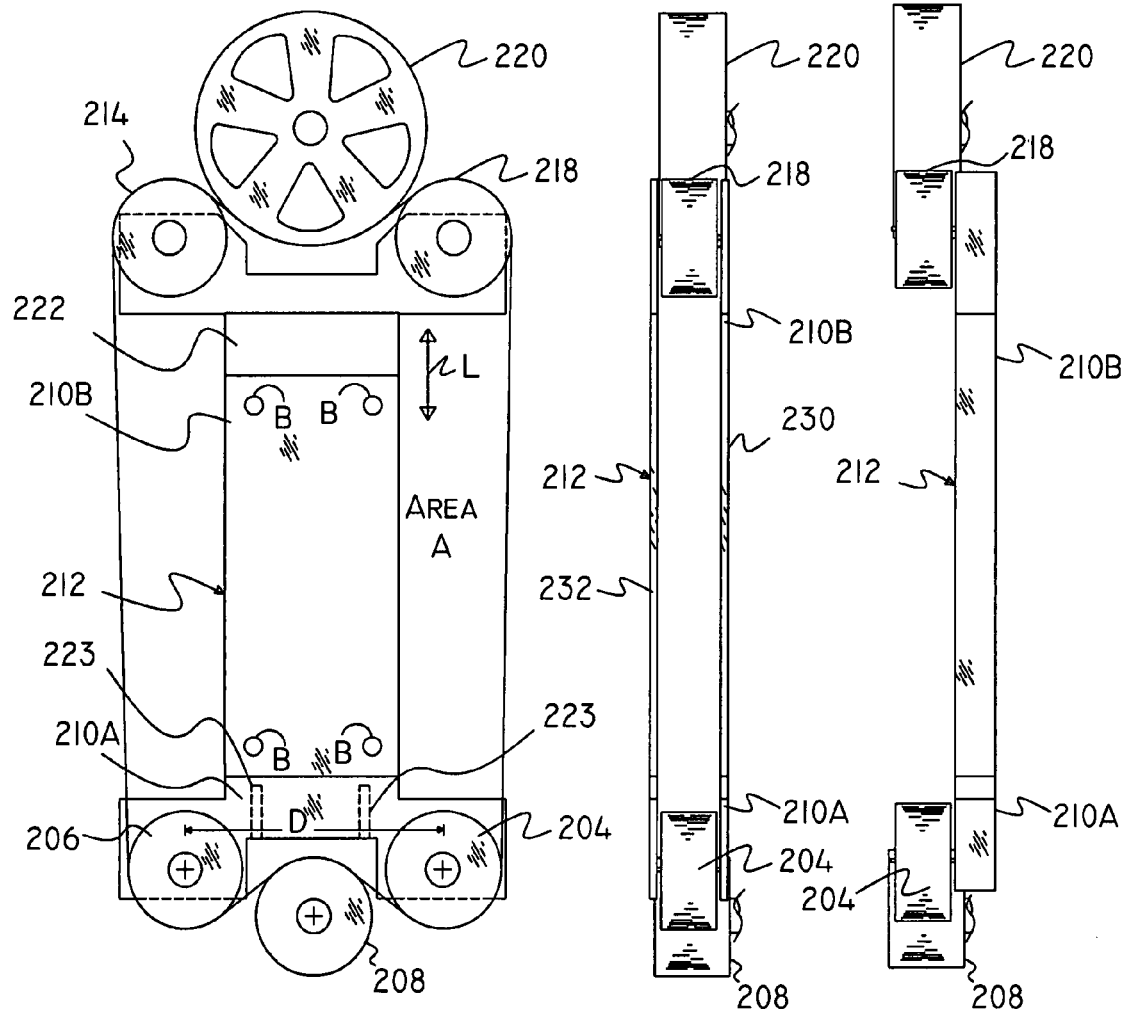
FIG. 2A
FIG. 2B  FIG. 2C  FIG. 2D

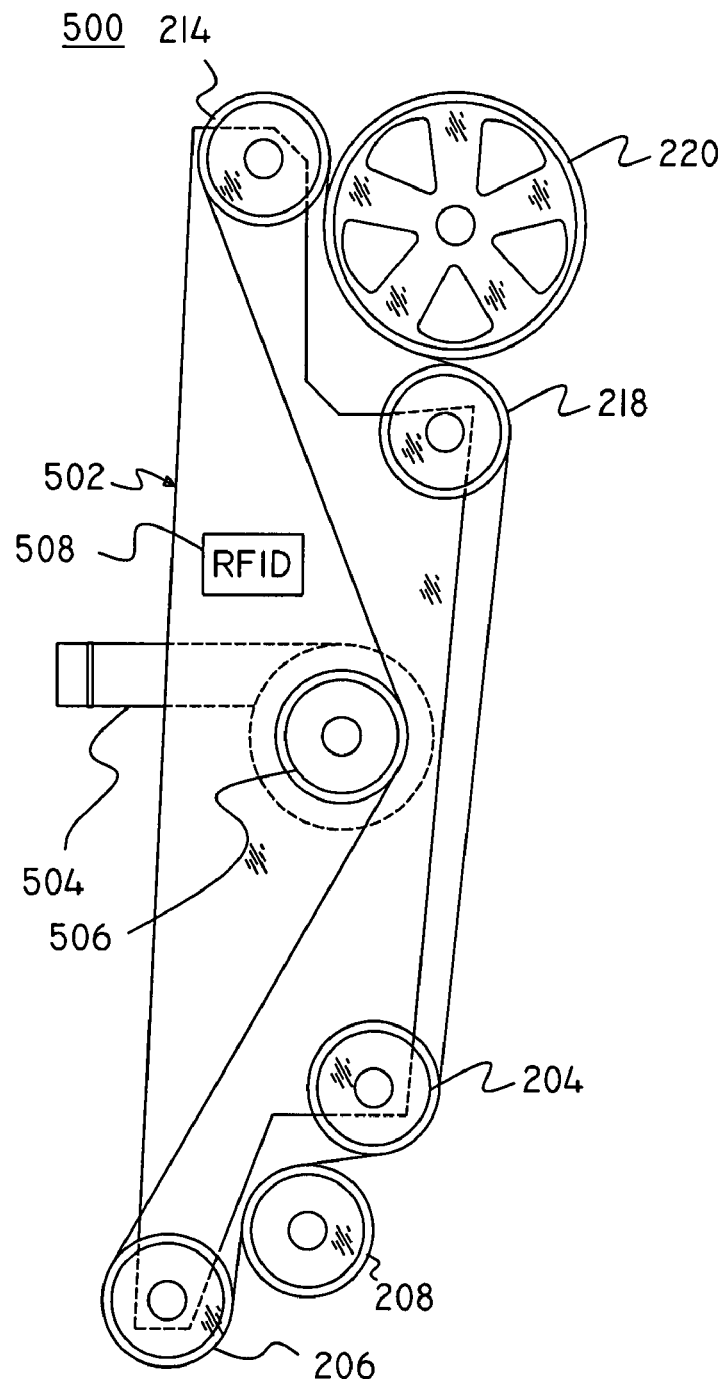
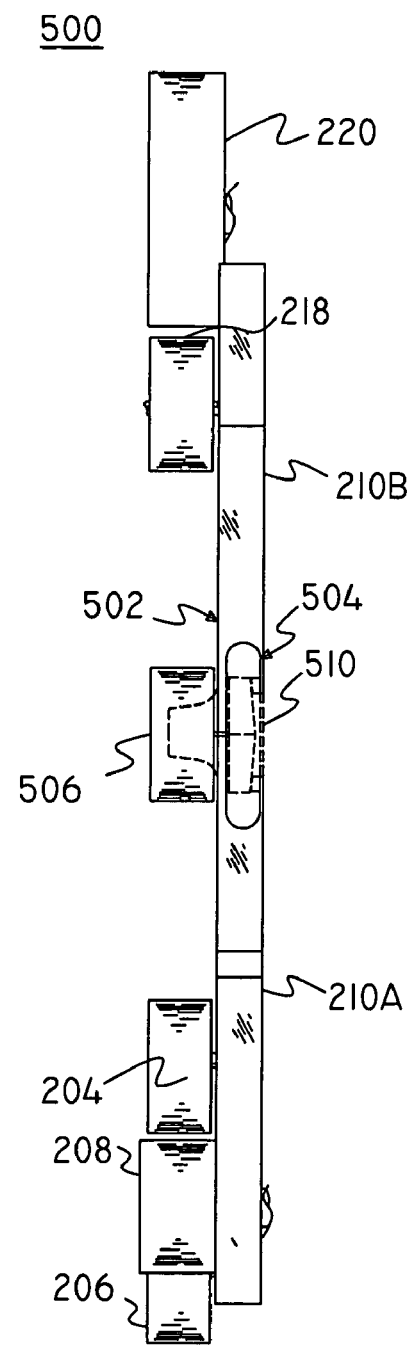
FIG. 5A
FIG. 5B

DRIVE CONFIGURATION AND METHOD THEREOF

FIELD OF THE INVENTION

The present invention relates generally to a drive configuration for mounting drive belts, and more particularly to an apparatus and method for mounting a timing belt and a method for changing the same.

BACKGROUND OF THE INVENTION

Typically, vehicles use a timing belt or a timing chain to operate one or more camshafts and/or other accessories (e.g., oil and/or water pumps, balance shafts, etc.). Timing belts are preferred over timing chains for many reasons. For example, timing belts cost less and emit less noise than conventional timing chains when used in automobiles and other vehicles. Moreover, timing belts do not require lubrication and initially cost less than a timing chain. However, timing belts have a limited life span and typically require replacement in as little as 25,000 miles (as opposed to timing chains which can last for the life of the vehicle).

Because of high replacement cost, timing belts are usually neglected until they fail. However, timing-belt failure can lead to engine failure-especially in interference-type engines.

In addition to the fact that timing belts require more frequent replacement, this replacement can be tedious (and require many hours of work). For example, engine mounts, various pulleys and/or accessories such as power steering pumps, air conditioning compressors, alternators, etc. and/or their associated belts, pulleys, wiring, etc. must be removed to gain access to one or more timing belt covers which must be removed to gain access to the timing belt cavity. Thereafter, one or more tensioners, idler pulleys, water pumps, etc. must be adjusted and/or removed so that the timing belt can be removed and replaced. This process can take several hours and can be further complicated when an engine is of a V- or H-type configuration and/or includes a double overhead camshaft (DOHC) arrangement (as opposed to single overhead camshaft (SOHC) arrangement). Accordingly, timing-belt replacement costs can range from several hundred to a thousand dollars or more, of which only a few dollars is attributable to the cost of parts. Thus, consumers are inconvenienced and mechanics, as opposed to manufacturers, reap most of the profits from timing-belt replacement procedures.

A front view diagram illustrating a conventional timing belt arrangement in a DOHC (double overhead cam) inline engine configuration is shown in FIG. 1. For the sake of clarity, components such as a timing-belt cover, alternator, air conditioning (A/C) compressor, hydraulic pumps and their associated drive belts and/or associated pulleys and/or sprockets are not shown. A timing belt 10 is driven by a crankshaft sprocket (whose teeth are not shown for the sake of clarity) 12 and drives one or more camshaft sprockets (whose teeth are also not shown for the sake of clarity) 14 and 16 and may also drive one or more accessories (e.g., oil pump, balance shaft, etc.) 20. A tensioner pulley 18 provides tension to the timing belt 10. A front engine cover (aka an engine front cover) 26 which, for the sake of this discussion, can include all or part the engine's cylinder block, cylinder head, oil pan, front engine case, cylinder-head cover, water pump, oil pump, other elements, and/or combinations thereof, forms at least a part of a cavity for protecting the timing belt 10 (and associated components such as the pulleys, tensioners, balance belts, etc.) from being contaminated by the elements. The other part of the cavity may be formed, for example, by one or more timing-belt covers, etc. which, for the sake of clarity, are not shown. As shown, in a typical front-wheel-drive transverse-engine layout, a side motor mount 24 may be attached to the front engine cover 26 (and/or engine block and/or cylinder head). However, for the sake of clarity, throughout this application, a front engine cover will be referenced. A fluid passage 28 provides a means for transferring fluid to/from the engine. For example, as shown, the fluid passage 28 is a coolant passage for transferring coolant to/from a water pump (not shown) which is mounted adjacent to the fluid passage 28. As shown in the present application, it will be assumed that the crankshaft sprocket 12 rotates in a clockwise direction. However, other directions are also envisioned.

Typically, after the timing-belt (or belts) is installed, the one or more timing belt covers are used to protect the timing belt from the elements. Then, other components such as pulleys (e.g., a crankshaft pulley, harmonic balancer, etc.) are attached to an exposed end of the crankshaft (not shown). The crankshaft pulley is used to drive accessories such as the water, air and/or power-steering/hydraulic pumps, alternator, A/C compressor, etc. using one or more accessory drive belts.

Moreover, as typical timing-belt installation is complicated, timing belts are often incorrectly installed. Accordingly, it is not uncommon for components (such as cams, balance shafts, etc.) to be misaligned (i.e., mistimed) which can adversely affect fuel economy, timing, engine life, balance (e.g., resulting in vibration), and can lead to unexpected engine failure—which can occur at critical times. Moreover, improper tensioning, can allow a timing belt to skip, which can also result in unexpected failure (e.g., of the belt and the engine) and lead to a dangerous situation. For example, when a driver accelerates to cross a busy three-lane boulevard, if a timing belt skips cogs when the driver begins to accelerate, the engine can stall and leave the vehicle unexpectedly in the path of oncoming traffic.

Furthermore, because of high timing-belt replacement costs, used car values are affected by mileage and/or age (e.g., 5 years or 60,000 miles), which corresponds with timing belt replacement intervals. Moreover, because of these high costs, owners may avoid changing the timing belts (and related components) at recommended intervals, which can lead to unexpected engine failure. Further, typical variable valve timing systems adjust a rotational angle of a camshaft relative to a corresponding cam sprocket which is attached to the camshaft. This system typically requires a large number of parts which increases cost and the likelihood of failure. Moreover, typical variable valve timing systems require high-oil pressure (e.g., 1700 psi) lines for proper operation.

Accordingly, there is a need for an apparatus and a method for easily replacing timing belts in vehicles that avoid the problems and disadvantages of the prior art.

SUMMARY OF THE INVENTION

Therefore, it is an object of the present invention to solve the above-noted and other problems of conventional timing belts and to provide an apparatus and a method for easily mounting and installing timing belts (or chains) in vehicles. It is another aspect of the present invention to provide an apparatus and a method for driving vehicle accessories such as alternators, air conditioning compressors, power steering pumps, etc. It is yet another aspect of the present invention to provide a means for changing a timing belt without removing accessory belts such as power steering, air conditioning, water pump, alternator, etc. drive belts. It is another aspect of the present invention to provide a cartridge including base for supporting pulleys and a timing belt. Wherein the timing belt can be installed or removed by installing or removing the cartridge.

It is another object of the present invention to provide an apparatus and a method for easily determining the age of a timing belt.

It is yet another object of the present invention to provide an apparatus and a method for mounting a drive belt for driving one or more shafts (e.g., water and/or power steering pump shafts, cam shafts, balance shafts, alternator shafts, etc.).

Accordingly, it is an object of the present invention to provide a timing belt cartridge apparatus for transferring a force to or from a first pulley, the cartridge apparatus including a base, one or more secondary pulleys at least one of which is attached to the base, the one or more secondary pulleys being situated on opposing sides of the first pulley, a belt having first and second sides, the first side engaging the first pulley and the second side engaging the one or more secondary pulleys. The apparatus may further include one or more cam pulleys engaging the first side of the belt, and one or more other pulleys situated about the one or more cam pulleys and engaging the second side of the belt, and matching cogs attached to the first pulley, the one or more cam pulleys, and the belt. The apparatus may further include a tensioner which tensions the belt, and matching cogs attached to the first pulley and the belt. The apparatus may further include one or more pumps attached to the base. The one or more pumps may include one or more of a water pump and an oil pump.

It is a further aspect of the present invention to provide a timing mechanism apparatus which adjusts the position of certain parts of the timing belt relative to each other. The timing mechanism may further include one or more cam pulleys engaging the belt, and matching cogs attached to the first pulley, the one or more cam pulleys, and the belt. In the apparatus, the one or more cam pulleys can have a diameter which is substantially twice a diameter of the first pulley. The apparatus may further a controller for controlling the timing mechanism and/or a radio frequency identification (RFID) transmitter for transmitting information related to apparatus. The timing belt according to the present invention may also include one or more metal links so as to form a timing chain.

It is a further aspect of the present invention to provide a variable valve timing apparatus for adjusting valve timing in an engine, the apparatus including a first element including one of a belt of a chain, at least first and second pulleys, the second pulley optionally having a diameter that is about twice the diameter of the first pulley (or about twice as many teeth as those on the first pulley), the first and second pulleys engaging the first element, another pulley engaging and positioning the first element, and a timing adjusting mechanism adjusting a rotational position of the first and second pulleys relative to each other by adjusting the position of the another pulley. The apparatus may further include a controller for controlling the timing adjusting mechanism and an actuator for adjusting the position of the another pulley.

It is also envisioned that the apparatus according to the present invention can include a belt for driving a first set of pulleys and a chain for driving at least another pulley. Further, certain shafts associate with the present invention may be driven by gears. For example, if the present invention includes a pump such as an oil pump, etc., then certain shafts associated with the pump may include a gear drive.

It is a further aspect of the present invention to provide a drive configuration for driving one or more rotating sprockets, including a flexible force transmitting member forming a closed curve enclosing an area; a drive sprocket situated outside the area and driving the force transmitting member; first and second pulleys situated at least partially within the area and on opposing sides of the drive sprocket so as to urge the force transmitting member against the drive sprocket; and one or more driven sprockets each coupled to the force transmitting member. The drive configuration may include a base structured and arranged to support one or more of the first and second pulleys; the drive sprocket can be connected to a crankshaft of an engine; and one or more of the driven sprockets can be correspondingly connected to one or more of a camshaft, an intermediate sprocket for driving a camshaft, a hydraulic pump, and a balance shaft of the engine. The force transmitting member preferably is a timing belt or a timing chain.

It is also envisioned that the present invention may include one or more of hydraulic pumps, electrical generation devices, motors, solenoids, idler pulleys, adjusting mechanisms, tensioning mechanisms, and balance shafts, connected to the base; an adjusting mechanism which adjusts the rotational position of one or more of the driven sprockets relative to drive sprocket; and a tensioning mechanism for taking up slack in the force transmitting member. The adjusting mechanism may rotate a pulley about the axis of another pulley, the drive sprocket, one of the driven sprockets, or one of the first or second pulleys.

According to the present invention, the base, at least one of the pulleys, and the force transmitting member may form at least part of a cartridge that is structured and arranged to be installed or removed from the engine as a unit. The force transmitting member may be coupled to, for example, a sprocket or a pulley of one or more of a camshaft, a water pump, an oil pump, a propeller, a balance shaft, and an axle.

It is also envisioned that the drive configuration according may include another force transmitting member in another plane different from the plane of the first force transmitting member and which forms another closed curve enclosing another area (which may overlap the area) such that the drive sprocket is situated outside the other area and drives the other force transmitting member and may included one or more other driven sprockets driven by the other force transmitting member.

It is a further aspect of the present invention to provide a valve train drive configuration for an internal combustion engine having a drive sprocket (e.g., a crankshaft sprocket) for transferring a force to or from one or more other sprockets via a flexible force transmitting member, the valve train configuration may include first and second pulleys; a base structured and arranged to be connected to the engine and at least one of the first and second pulleys such that the axis of the first and second pulleys are situated apart from each other; a force transmitting member forming a closed curve enclosing an area, wherein the first and second pulleys are situated at least in part within the area and apart from each other so as to urge the force transmitting member against the drive sprocket such that the force transmitting member is coupled to the drive sprocket, the drive sprocket being located outside of the area.

It is also envisioned that the base, one or more of the first and second pulleys, and the force transmitting member may form a cartridge which enables the installation or removal of the force transmitting member from the engine. The force transmitting member may include a timing belt or a chain, the drive sprocket may include a crankshaft sprocket which is coupled a crankshaft of the engine, and the one or more other sprockets may include camshaft sprockets, intermediate shaft sprockets, balance shaft sprockets, and hydraulic pump sprockets, which may be coupled to the force transmitting member. One or more of the pulleys may include teeth so as to form a sprocket. The cartridge may be structured and arranged to be coupled to the engine and further include one or more of a water pump, a tensioner, and an idler pulley.

It is a further aspect of the present invention to provide a method for configuring a flexible force transmitting member in an engine, the method including forming, using the flexible force transmitting member including a belt or chain, a closed curve defining an area; locating first and second pulleys apart from each other and about a drive sprocket; routing the flexible force transmitting member about the first and second pulleys and the drive sprocket such that the first and second pulleys are located within the area and the drive sprocket is located outside of the area. The method may also include forming a cartridge including at least one of the first and second pulleys, a base part, and the force transmitting member, the base part structured and arranged to be connected to the engine and to support at least one of the first and second pulleys. The method may also include installing or removing the cartridge from the engine, so that the force transmitting member is correspondingly installed or removed from the engine, wherein the engine is an internal combustion engine and the drive sprocket is an engine output shaft sprocket.

Additional advantages of the present invention include the incorporation of features that reduce the complexity and cost of manufacturing.

BRIEF DESCRIPTION OF THE DRAWINGS

The invention is herein described, by way of example only, with reference to the accompanying drawings, wherein:

FIG. 2A is a front view diagram illustrating the timing belt apparatus according to the present invention;

FIG. 2B is a front-view diagram illustrating the timing belt apparatus according to the present invention;

FIG. 2C is a side view illustration of a timing belt apparatus according to the present invention;

FIG. 2D is a side view illustration of a timing belt apparatus according to the present invention;

FIG. 5A is a front view diagram illustrating the timing belt apparatus according to the present invention;

FIG. 5B is a side view diagram illustrating the timing belt apparatus shown in FIG. 5A;

DETAILED DESCRIPTION OF THE INVENTION

Figure 1:
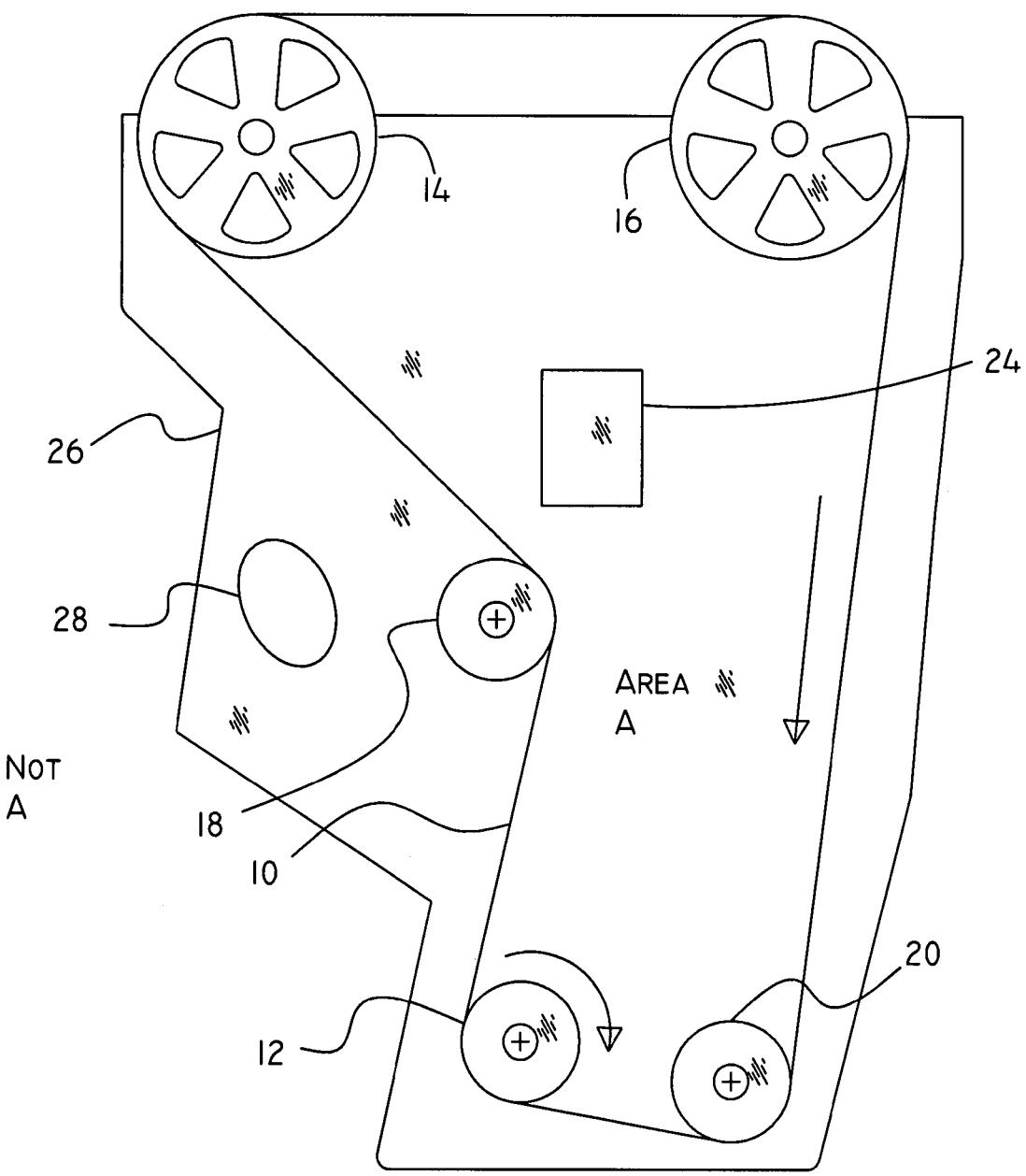
FIG. 1 is a front view diagram illustrating a conventional timing belt arrangement in a DOHC (double overhead cam) inline engine configuration.

Preferred embodiments of the present invention will now be described in detail with reference to the drawings. For the sake of clarity, certain features of the invention will not be discussed when they would be apparent to those with skill in the art.

A front view diagram illustrating the timing belt apparatus according to the present invention is shown in FIG. 2A. Pulleys 204 and 206 position timing belt 202 so that it engages sprocket 208. A mounting part 210 can include one or more elements (e.g., one or more front plates, rear plates, struts, rods, etc., as will be described below) and positions one or more of the pulleys 204 and 206 so that the timing belt 202 is located in a desired position relative to the sprocket 208 (e.g., a crankshaft sprocket which, for example, is attached to an engines crankshaft). The mounting part 210 is attached to an engine block or to a corresponding component (e.g., a front cover, cylinder head, etc.—which are not shown) via any suitable means. For example, tracks, rails, guides, bolts, pins, friction fits, keyways, etc. can be used to attach the mounting part 210 to, for example, the front cover of the engine. For the sake of clarity, mounting means for attaching the mounting part 210 to the engine will not be shown. Moreover, also for the sake of clarity, only a few cogs "C" (or teeth) are shown on each of the timing belt 202 and crank sprocket 208. Optional cavities 223 can be used for accepting guide pins and/or securing the mounting part 210 using, for example, bolts, lugs, pins, etc. For example, during installation, a bifurcated tool (not shown) can be aligned with sprocket 208 (and likewise the crankshaft—using, for example, a pin which is not shown) and its ends inserted into the mounting part 210 such that the mounting part 210 is aligned with the sprocket 208 and possibly rotated therewith. This can aid the installation process as will be described below. However, it is also envisioned that the cavities can extend through one or more ends of the mounting part 210 such that one or more guide pins, bolts, rods, etc. can be inserted therein.

A front-view diagram illustrating the timing belt apparatus according to the present invention is shown in FIG. 2B. A mounting part 212 can include one or more mounting parts (e.g., 210A and 210B as shown) which can be separated as desired. One or more pulleys 204 and 206 are mounted to the mounting part 212 such that a desired number of teeth (not shown for the sake of clarity) of timing belt 202 may contact the crank pulley 208. Likewise, one or more pulleys 214 and 218 are mounted to the mounting part 210B so that the timing belt 202 is located in a desired position relative to cam sprocket 220. For example, when pulleys are located in the desired position, a number of teeth of the timing belt 202 may engage a corresponding sprocket. The timing belt 202 forms a closed loop which defines an area A in which the pulleys 204 and 206 are located. As shown, the crank pulley 208 is located outside of area A. Accordingly, the timing belt can be installed without removing accessory belts such as an alternator, air conditioning, etc., belts which are be installed on a crankshaft pulley that is installed at a proximal end of the crankshaft (e.g., see, FIGS. 6A-6B and 7A-7B).

As shown, a SOHC cam arrangement is illustrated. Although the one or more pulleys 204, 206, 214 and 218 are shown attached to the mounting part 212, one or more of these pulleys may be mounted to other elements. Moreover, it is envisioned that the mounting part 212 can included joints and other means for attaching various parts (e.g., 210A and 210B) to each other and can be made using for example, one or more elements which may include rods, molded parts, stamped parts, etc. Moreover, if the mounting part 212 includes a plurality of parts, each part may be mounted separately from the other. For the sake of clarity, the timing belt 202 and/or the sprockets 208 and 220 do not show individual cogs. An optional adjusting means 222 can include means for adjusting the length (e.g., in the direction of arrow L) of the mounting part 212 such that the distance between one or more of the one or more pulleys 204, 206, 214, and 218 can be changed (or otherwise adjusted). For example, an optional adjusting means 222 may include a sliding type mechanism for adjusting the distance between the pulleys 214 and 218 and the pulleys 204 and 216. The adjustment means 222 may include a biasing means which can, for example, include biasing means such as springs and/or one or more hydraulic cylinders (which can include a spring and/or pressurized fluid, etc.) for providing a desired biasing and/or optional damping means. In other words, the adjustment means 222 can include a conventional tensioner for adjusting the tension of the timing belt 202. In alternative embodiments, a cam-type mechanism may be used for adjusting the length of the mounting part 212. A bolt may then be tightened to maintain a desired configuration. In other embodiments adjusting means 222 may include a hinge and one or more biasing means. Accordingly, the adjusting means 222 can provide proper timing-belt tension, if desired. Moreover, the adjusting means may provide an adjustment for various dimensional changes which can include, for example, expansion and contraction of various engine components (with, for example, cooling/heating cycles), and dimensional changes resulting from, for example, the machining of cylinder deck surfaces and/or cylinder heads (both of which are not shown), etc. For the sake of clarity, in FIGS. 2C-2D, 5B and 6B, the timing belt 202 is not shown. Moreover, flanges and/or other guide means, which are typically located on one or more pulleys and/or sprockets for properly guiding the timing belt 202 are also not shown for the sake of clarity.

For the sake of description, without limitation, one or more optional mounting holes B (shown in arbitrary locations) can be used for locating the mounting part 212 in a desired position. For example, pegs, studs, bolts, etc. (located in various positions) can be used to attach the mounting part 212 to the engine block (not shown), cylinder head, front cover, etc. so that it is located in a desired position.

The mounting part 212 is preferably sufficiently rigid such that desired noise-vibration-harshness (NVH) levels are obtained.

A side view illustration of a timing belt apparatus according to the present invention is shown in FIG. 2C. The timing belt apparatus is similar to the timing belt apparatus shown in FIG. 2B. However, one or more of first and second portions 230 and 232 are used to position one or more of the one or more pulleys 206, 208, 214, and 218. Spacers or other means are used to locate the first and second portions 230 and 232 relative to each other. The first and second portions 230 and 232 can each include one or more plates such that one or more pulleys of the pulleys 206, 208, 214, and 218 can be separated from each other. For example, the first and second portions 230 and 232 can include, for example, one or more portions which can correspond with sections 210A and 210B as shown in FIG. 2B. The optional portions corresponding with sections 2110A and 210B may be separated from each other to aid the installation process. By separating at least parts of the first and second portions 230 and 232 one or more cavities 217 can be defined such that the one or more pulleys of the one or more pulleys 206, 208, 214, and 218 may be fully of partially contained in the one or more cavities 217. Moreover, other components such as, for example, a water pump, an oil pump, etc. may fully or partially contained within the one or more cavities 217. Further, although the portions 230 and 232 are illustrated as planar components, they be integrally formed with each other, molded, stamped, etc. as desired. Moreover, one or more of the first and second portions 230 may form at least part of an outer cover for protecting the timing belt and the associated components from contaminating elements. For the sake of clarity, the optional adjustment means 222 is not shown.

A side view illustration of a timing belt apparatus according to the present invention is shown in FIG. 2D. The timing belt apparatus is similar to the timing belt apparatus shown in FIG. 2B. The mounting part 212 includes the first part 210A and the optional second part 210B. However, mounting part 212 can include a single part or a plurality of parts, as desired. For example, depending upon the engine and/or vehicle chassis, a single part or a plurality of parts can be used to expedite installation of the timing belt using the apparatus according to the present invention. The timing belt apparatus according to the present invention is attached to the engine using one or more attachment means such as brackets, bolts, rails, rivets, adhesives, friction fits, etc., as desired. For the sake of clarity, the optional adjusting means 222 is not shown.

Figures 3A, 3B:
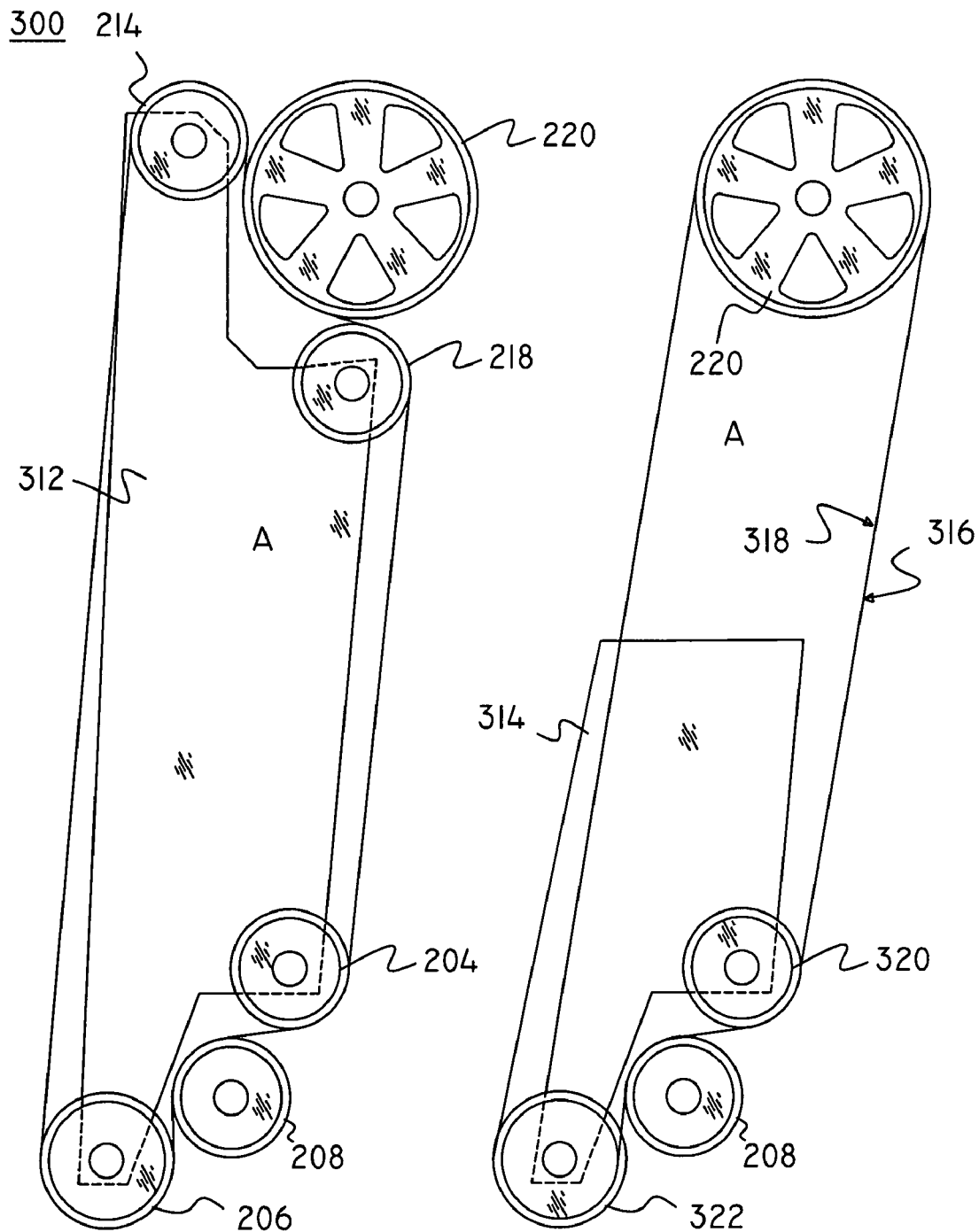
FIG. 3A is a side view diagram illustrating the timing belt apparatus according to the present invention.
FIG. 3B is a side view diagram illustrating the timing belt apparatus according to the present invention.

A front-view diagram illustrating the timing belt apparatus according to the present invention is shown in FIG. 3A. The timing belt apparatus 300 is essentially similar to the timing belt apparatus shown in FIG. 2B. However, a mounting part 312 is shaped and sized such that one or more pulleys 204, 206, 214, and/or 218 are offset at predetermined angles and/or distances. Accordingly, by offsetting one or more of the one or more pulleys 204, 206, 214, and/or 218, the timing belt apparatus 300 according to the present invention assumes a desired profile. Moreover, a desired installation configuration can be obtained. In other words, the timing belt apparatus 300 according to the present invention can be installed by physically maneuvering it in a predetermined manner. For the sake of clarity, optional adjusting means (e.g., a tensioner, which can be optionally mounted to the timing belt apparatus 300 of the present invention) is not shown.

A side-view diagram illustrating the timing belt apparatus according to the present invention is shown in FIG. 3B. The timing belt apparatus includes a mounting part 314 which is essentially similar to the mounting part 210 and can be positioned in proximity to, for example, the crank sprocket 208. However, sprockets 320 and 322 are used rather than pulleys (i.e., pulleys 204 and 206) and timing belt 302 includes cogs (not shown) on both of sides 316 and 318 for contacting (i.e., engaging) cogs (not shown) of the crank and cam sprockets 208 and 220, respectively. An optional adjusting means, such as a tensioner, is not shown for the sake of clarity and can be mounted on or independently of the mounting part 314.

Figure 4A:
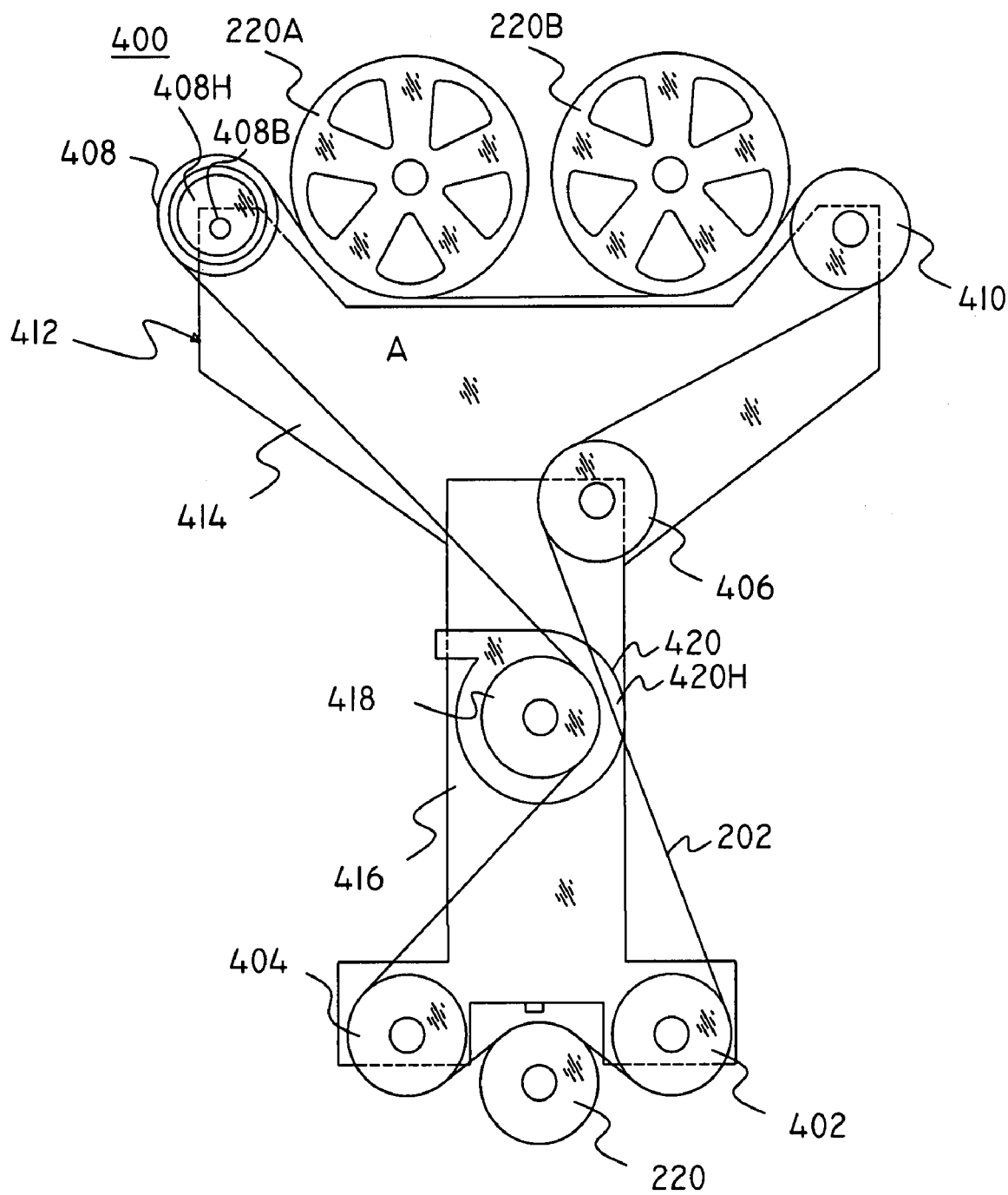
FIG. 4A is a front view illustration of a timing belt apparatus according to the present invention.

A front view illustration of a timing belt apparatus according to the present invention is shown in FIG. 4A. The timing belt apparatus 400 is essentially similar to the timing belt apparatus shown in FIG. 2B. However, the timing belt apparatus 400 is used in a DOHC configuration in which cams 220A and 220B are driven by timing belt 202, and includes various pulleys and other components which will be described below. The timing belt apparatus 400 includes a mounting part 412 for locating one or more pulleys 402, 404, 406, 408, 410, and/or 418 (one or more of which may be optional) which are used for positioning the timing belt 202 in a desired position. An optional water pump 420 is attached to the mounting part 412 and is driven by the pulley 418. The optional water pump 420 can be optionally formed, for example, at least in part, with mounting part 412. For example, at least part of a water pump housing 420H may be formed integrally with the mounting part 412. Additionally, the mounting part 412 may include one or more passages (not shown) for providing coolant to and/or from the water pump 420 from the engine and/or radiator (not shown), as necessary. The pulley 406 is optional and can be used to, for example, locate the timing belt 202 within a given profile as shown. Pulleys 408 and 410 are situated such that cogs (not shown) of the timing belt 202 may engage a predetermined number of cogs (not shown) of each of cams 220A and 220B. Depending upon desired applications, the mounting part 412 can be formed using one or parts. For example, the mounting part 412 can include first and second parts 414 and 416, respectively, which may, for example, include engagement means (e.g., bolts, pins, friction fits, keyways, guides, hinge portions, etc.) for engagement with each other. Accordingly, depending upon the application, the parts (e.g., first and second parts, etc.) can be installed in a desired order. One or more of the pulleys 402, 404, 406, 408, 410, and 418 can include an adjusting means such as, for example, one or more tensioners (not shown) for tensioning the timing belt 202. Tensioners can include spring- and/or hydraulic-biased tensioners, etc., for biasing the corresponding pulley. Furthermore, the one or more tensioners can include other adjusting means such as a cam, shim, etc. Moreover, one or more of the pulleys 402, 404, 406, 408, 410, and 418 can include a cam means for adjusting tension of the timing belt 202. For example, pulley 408 includes an cam-type adjusting means including a hub 408H having an offset bolt hole 408B. The placement of the one or more pulleys 404, 406, 408, 410, and 418 is shown for illustration only and is dependent upon the actual engines used. During installation, the cam pulleys 220A and 220B which are located preferably at the top part of the engine may be removed so that the mounting part 412 can be slideably inserted into a corresponding timing belt cavity (not shown).

Figure 4B:
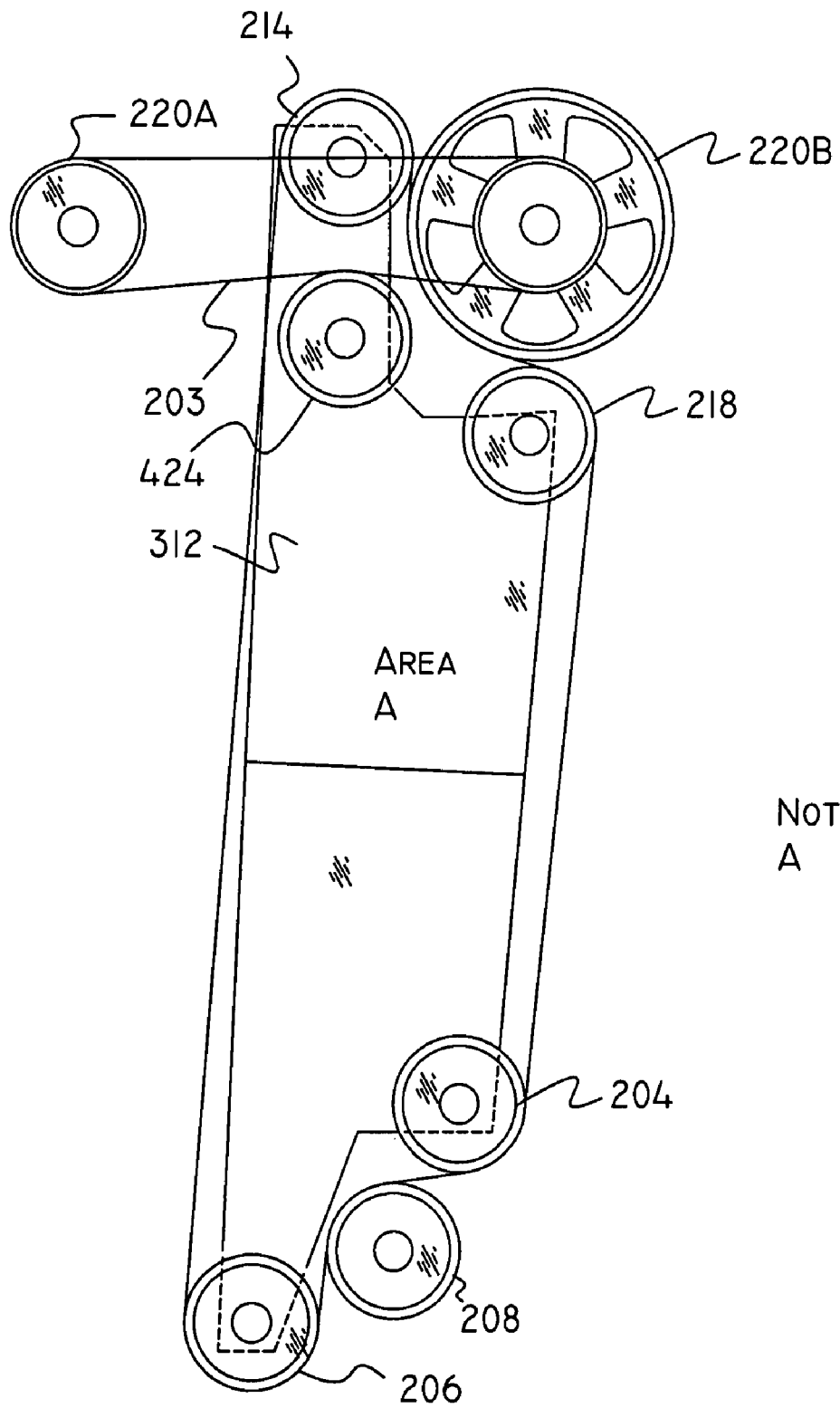
FIG. 4B is a front view diagram illustrating the timing belt apparatus according to the present invention.

A side-view diagram illustrating the timing belt apparatus according to the present invention is shown in FIG. 4B. The timing belt apparatus is essentially similar to the timing belt apparatus shown in FIG. 3A. However, a DOHC arrangement is shown in which cam sprocket 220A is driven using a second timing belt 203. An optional tensioner 424 provides a biasing force to the second timing belt 203. The optional tensioner can include cam or other adjusting means to adjust the biasing force provided to the second timing belt 203.

A front-view diagram illustrating the timing belt apparatus according to the present invention is shown in FIG. 5A. The timing apparatus 500 is essentially similar to the timing belt apparatus shown in FIG. 3A. However, a mounting part 502 (which may include one or more parts) includes a water pump 504 and a water pump pulley 506 for driving the water pump 504. Although not shown, the water pump 504 may be formed at least in part integrally with the mounting part 502. However, the water pump may also be attached to the mounting part 502. In some embodiments, an oil pump, a tensioning means (not shown) such as a tensioner including a pulley, etc. may be used in addition to (or in lieu of) the water pump 504. In yet other embodiments, a variable valve timing (VVT) means for advancing/retarding the timing of one or more camshafts may also be included. Moreover, the mounting part 502 may include one or more parts and/or various shapes corresponding to a desired application. Moreover, the mounting part can be designed such that its size and shape is in accordance with one or more different engine configurations—thus enhancing parts interchangeability. In other embodiments, the timing belt or chain may drive an intermediate shaft. Another flexible tensioning device (i.e., a timing belt or chain) or a gear drive can then drive one or more of the camshafts.

In yet other embodiments, the apparatus according to the present invention may include identification (ID) means which can provide identification information (using, for example, a wired connection or a wireless connection) to a requesting device (e.g., an engine control unit (ECU)). For example, a radio frequency identification (RFID) tag 508 (including data corresponding to the apparatus according to the present invention) may be attached to or embedded into, for example, the mounting part 502. Then, an RFID reader can download information related to the RFID tag and determine characteristics of the apparatus according to the present invention. For example, when installing a new timing belt, an RFID can read the data corresponding to the RFID tag. Thereafter, this data can be used to determine proper change times and/or intervals for the apparatus according to the present invention. For example, transmitting this information to an on-board diagnostic computer such as the vehicle's own computer (i.e., the engine control unit—ECU), can enable the computer to use this data to determine a proper change time and indicate when a change of the apparatus according to the present invention is necessary via a vehicle display screen, the vehicle's audio system, and/or via other means such as an at-home computer (e.g., via the Internet), a dealership alert means (e.g., the dealerships maintenance system which can alert service personnel and/or the vehicles owner), etc. However, this data may also be used by other computational means. As shown, the RFID tag can include data such as type, lot number, date of production, identification (ID) number, routing codes (for example, indicating distribution sources), etc. Accordingly, grey market parts can be identified and/or rejected by, for example, the ECU, or the vehicle's manufacturer. Further, using information transmitted by the ID means, a controller (e.g., the ECU) may limit certain functions. For example, based upon the ID information, engine speed and or operation may be limited, as desired. Thus, upon determining that the ID of the apparatus meets a certain condition, engine speed (e.g., RPM) may be limited so that it is less than (or otherwise within a certain predetermined range), if for example a substandard timing belt (e.g., a belt by another manufacturer, a defective belt such as recalled belt, etc.) is detected. This can provide even higher levels of safety to users.

A side-view diagram illustrating the timing belt apparatus shown in FIG. 5A is shown in FIG. 5B. The shape, size and location of the water pump 504 is merely illustrative. Other water pumps may be used with the present invention. Additionally, the present invention may also include one or more water passages which mate to corresponding water passages (i.e., coolant passages) of a corresponding engine or parts thereof (not shown) for transmission of the engine's coolant. Similarly, one or more oil passages may be provided for receiving oil to/from an optional oil pump (not shown) for pressurizing the engine's oil system and/or driving a variable valve timing system. Although the water pump 504 is shown contained at least in part within the mounting part of the present invention, the water pump may also be located on an exterior portion of the mounting part. For example, the water pump or parts thereof may be located on a side of the mounting part which is opposite to the engine and/or may be located on side of the mounting part which faces the engine etc. For the sake of clarity, these configurations are not shown.

Figures 6A, 6B:
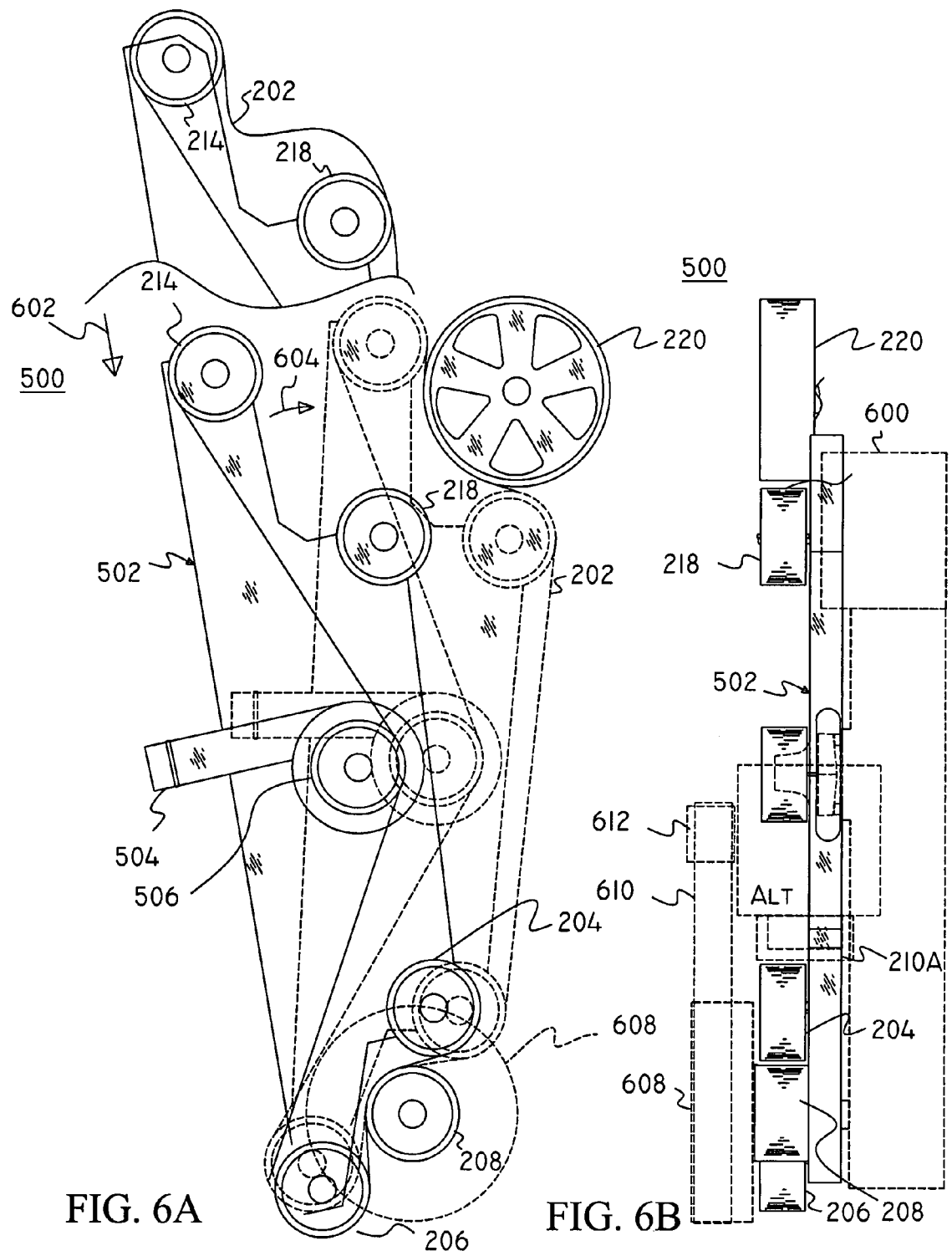
FIG. 6A is a front view diagram illustrating the installation of the timing belt apparatus according to the present invention as it is installed in an engine.
FIG. 6B is a side view diagram illustrating the installation of the timing belt apparatus shown in FIG. 6A.

A front view diagram illustrating the installation of the timing belt apparatus according to the present invention as it is installed in an engine is shown in FIG. 6A. For illustration, the timing belt apparatus is similar to the timing belt apparatus shown in FIGS. 5A-5B. During installation, one or more timing-belt covers (not shown) are opened or otherwise removed to access the timing belt apparatus according to the present invention. The timing belt apparatus according to the present invention can then be slid in the direction of arrow 600 into position relative to the engine (not shown). Thereafter, the timing belt 202 may be aligned with the crank sprocket 208 and the timing belt apparatus according to the present invention can be rotated in the direction of arrow 604 such that the timing belt 202 contacts the cam sprocket (or sprockets) 220. The timing belt apparatus according to the present invention may then be secured (e.g., by using bolts, nuts, rails, screws, pins, pressure fits, adhesives, and/or other attaching means), and the one or more timing-belt covers (not shown) is placed into a proper position to protect the timing belt 202 from the elements. An outline of a crank pulley 608 is shown for the purpose of illustration only.

A side view diagram illustrating the installation of the timing belt apparatus shown in FIG. 6A is shown in FIG. 6B. The timing belt apparatus according to the present invention is attached to engine 600. One or more accessories such as an alternator (ALT) are shown for the sake of illustration. With reference to FIG. 6B, one or more accessory pulleys such as an alternator pulley 612 are rotated by an accessory drive belt 610 which is in communication with the crank pulley 608. For the sake of clarity, that part of the cylinder head which positions the camshaft and corresponding camshaft pulley 220 is not shown.

Figure 7A:
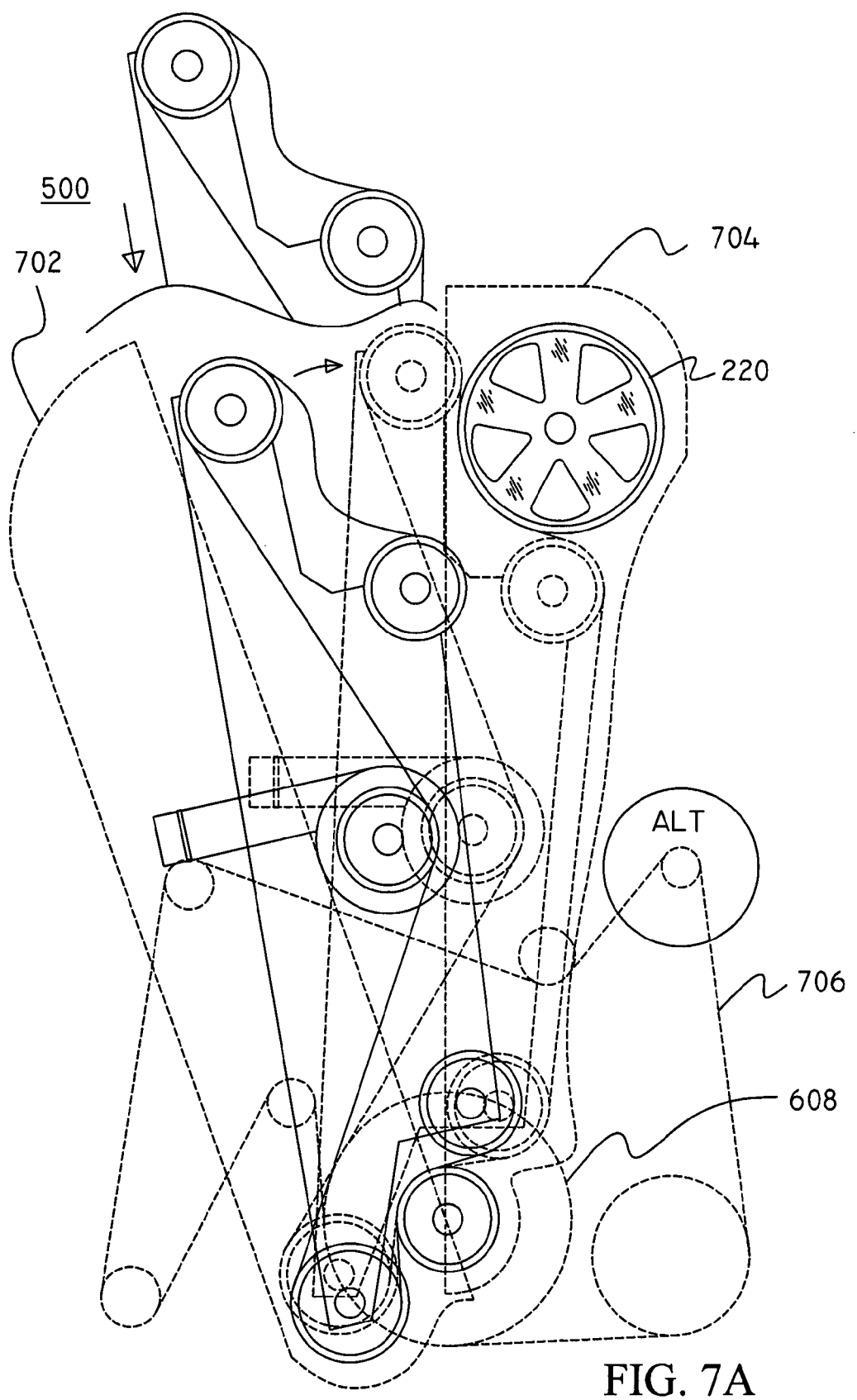
FIG. 7A is a front view diagram illustrating the installation of the timing belt apparatus shown in FIGS. 6A and 6B as it is installed in an engine.

A front view diagram illustrating the installation of the timing belt apparatus shown in FIGS. 6A and 6B as it is installed in an engine is shown in FIG. 7A. One or more timing belt covers 702 and 704 are opened or otherwise removed to open the timing belt cavity. Thereafter, the timing belt apparatus according to the present invention 500 is inserted into the cavity. Then, the timing belt apparatus according to the present invention is aligned and securely fastened such that the timing belt is properly positioned and such that one or more camshafts (or balance shafts, etc.) are correctly timed relative to the crankshaft. This process can be accomplished preferably without removing an accessory drive belt 706. Removal may be the reverse of installation. However, it may be desirable to cut the timing belt prior to removal. The accessory drive system includes, for example, the alternator (ALT) and/or various other accessories as shown attached to the accessory drive belt 706.

Figure 7B:
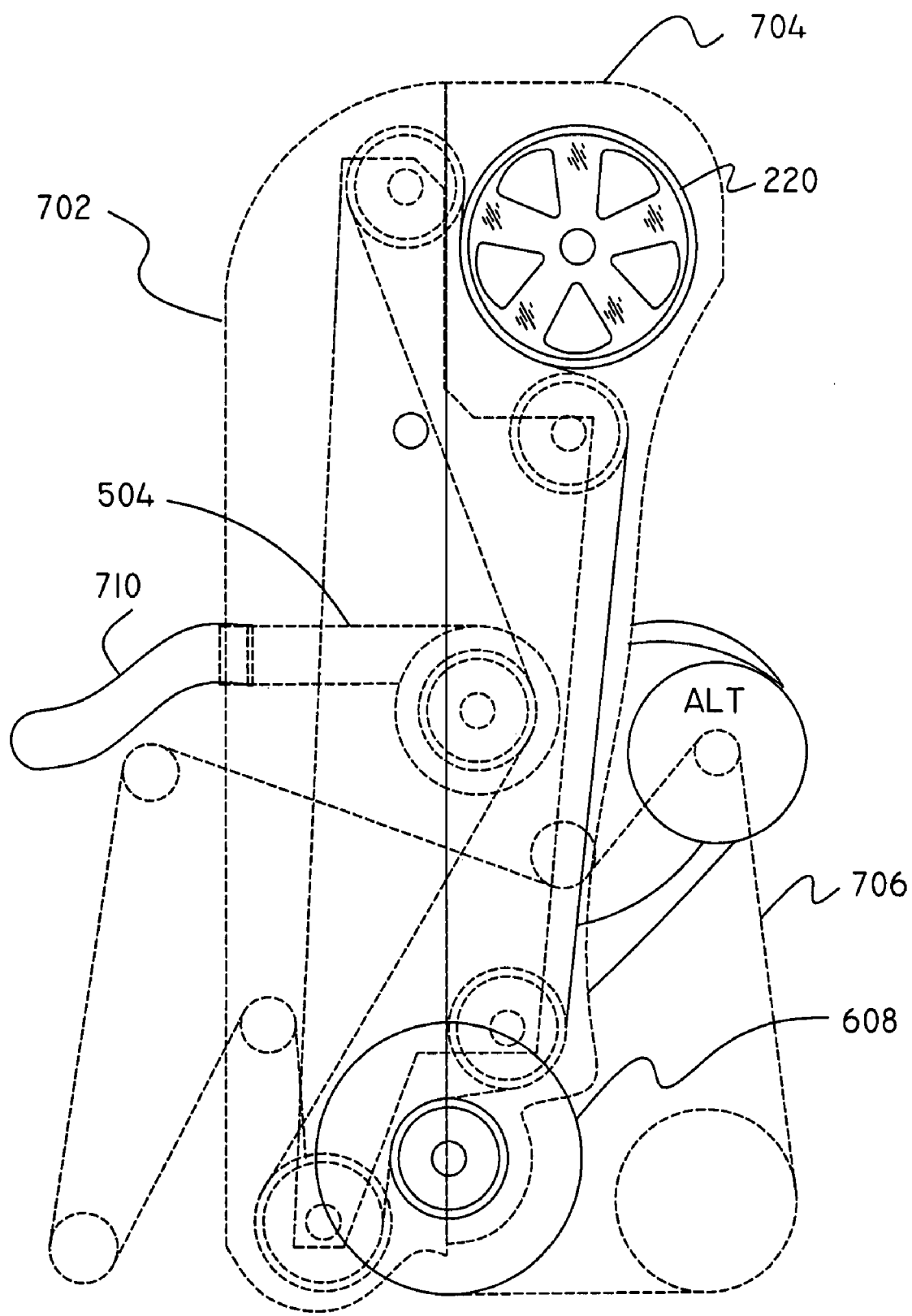
FIG. 7B is a front view diagram illustrating the installation of the timing belt apparatus shown in FIG. 7A.

A front view diagram illustrating the installation of the timing belt apparatus shown in FIG. 7A is shown in FIG. 7B. After installation, the one or more timing belt covers (e.g., 702 and 706) are closed thus forming at least part of a cavity for protecting the timing belt contained within. The timing belt covers (e.g., 702 and 706) may be held in position using any suitable holding means. For example, the holding means may include adhesives, latches, friction fits, screws, bolts, nuts, pins, latches, etc. For the sake of illustration, a coolant hose 710 is shown attached to an outlet of the water pump 504.

Figure 8A:
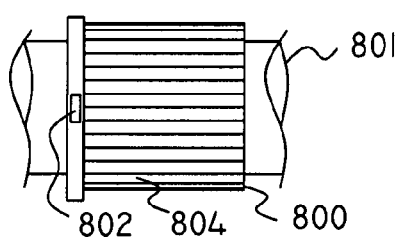
FIG. 8A is a side view diagram of an optional crank sprocket according to the present invention.

A side view diagram of an optional crank sprocket according to the present invention is shown in FIG. 8A. A crank sprocket 800 includes sprockets (or teeth) 804 and an optional alignment area such as an alignment grove, a first keyway 802, etc. The crank sprocket 800 is seen inserted over a distal end (or accessory end) of a crankshaft 801 and is preferably aligned with the crankshaft 801 using, for example, a second keyway (not shown).

Figure 8B:
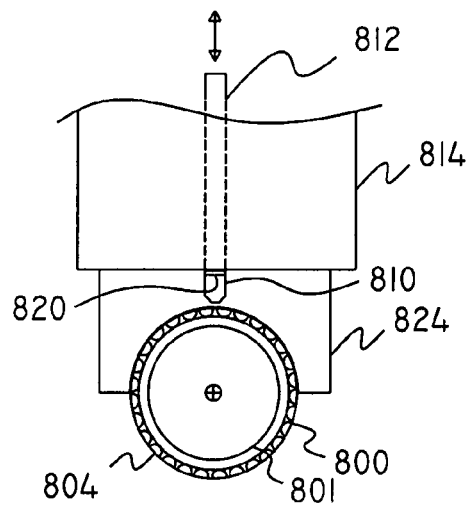
FIG. 8B is a front view diagram of the crank sprocket illustrated in FIG. 8A and a base part.

A front view diagram of the crank sprocket illustrated in FIG. 8A and a base part is shown in FIG. 8B. An optional guide 812 may be inserted within base part 814 (which can be similar to the base parts shown throughout this application). The guide 812 includes an optional foot 820 located in proximity to an end part 810. The foot 820 can be used to move a timing belt 806 into a desired position.

Figure 8C:
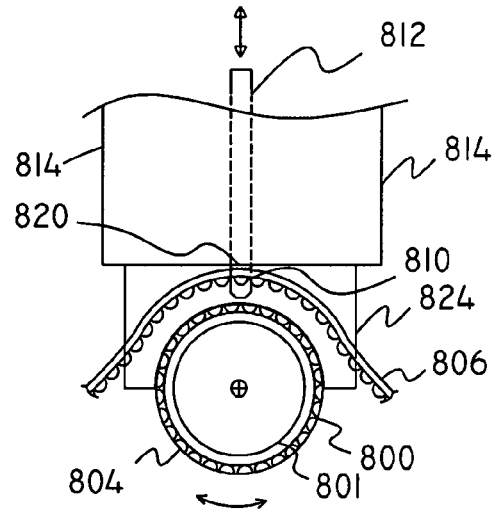
FIG. 8C is a front view diagram of the present invention illustrated in FIG. 8B.

A front view diagram of the present invention illustrated in FIG. 8B is shown in FIG. 8C. The end part 810 of the guide 812 locates the timing belt 806. A optional pad 824 contacts a guide part such as the crank sprocket 800, the crank 801, guide pins, etc. for locating the base part 814 during alignment of the timing belt 806. The pad 824 may optionally be slidably, rotatably, and/or releasably located relative to the base part 814.

Figure 8D:
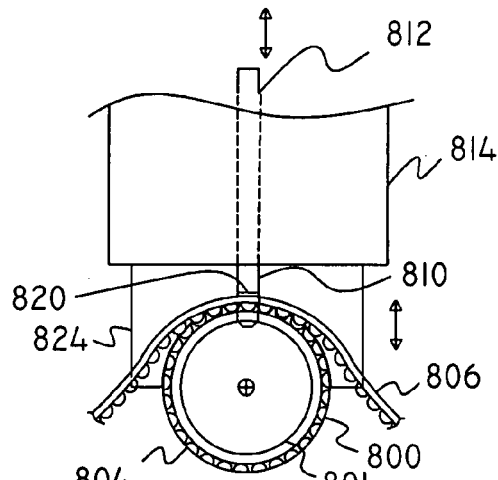
FIG. 8D is a front view diagram of the present invention illustrated in FIG. 8C.

A front view diagram of the present invention as illustrated in FIG. 8C is shown in FIG. 8D. The guide 812 is moved towards the crank pulley 8D such that the distal end 810 of the guide 812 engages the first keyway 802 indicating alignment with the crank sprocket 800. As the guide 812 extends into the crank sprocket 800, the timing belt 806 is aligned with and may engage the crank sprocket 800. Thereafter, the crank sprocket 800 can be rotated with the base part 814. Preferably, the timing belt is then aligned with other sprockets such as the cam and/or balance shaft sprockets and tensioned before the guide 812 is removed or released from the crank sprocket 800. In alternative embodiments, the guide 812 can include a frangible area such that it can be broken apart as necessary for example, after installation.

Figure 8E:
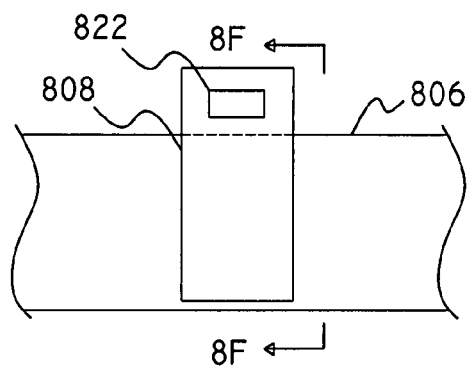
FIG. 8E is a top view diagram of the timing belt of the present invention.

A top view diagram of the timing belt of the present invention is illustrated in FIG. 8E. An optional tab 808 including an alignment means such as opening 822 can be releasably attached to the timing belt 806 at a predetermined position. After installation of the timing belt 806, the tab 808 can be manually removed or can be removed by other means.

It is also envisioned that a notch or other means may be used to align the timing belt 806. For example, the timing belt may include one or more notches, marks, stickers, holes, etc. for aiding an alignment process. Likewise, a corresponding engine part may include respective marks to aid in the alignment. Further, the one or more pulleys mounted to the apparatus of the present invention may be releasably locked in place using, for example, adhesives, keyways, rods, friction fits, etc. The timing belt may then be releasably positioned relative to the locked components. After installation, the locked components can be unlocked, e.g., by releasing the restraining means.

Figure 8F:
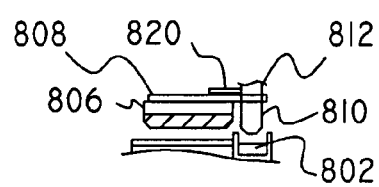
FIG. 8F is a cross sectional view diagram of the timing belt of the present invention taken along line 8F of FIG. 8E.

A cross sectional view diagram of the timing belt of the present invention taken along line 8F of FIG. 8E is illustrated in FIG. 8F. The end part 810 of the guide 812 is inserted through the opening 822 of the tab 808 and can be inserted into the optional first keyway 802. Accordingly, when the end part 810 of the guide 812 is inserted into the optional keyway 802, the timing belt 806 is aligned with the crank sprocket

800. Additionally, an alert means (e.g., notches, electrical signals, lines, etc.) can be used such that the user is informed of the alignment. The foot 820 is used to snug the timing belt 806 against the crankshaft sprocket 800. The tab 808 should be flexible enough such that it can be advanced with the timing belt 806 after installation of the timing belt 806. Accordingly, the tab may be easily removed by advancing the tab 808 (e.g., by turning the engine over) such that it can be readily grasped or may fall off by itself when the engine is cranked or started after installation.

Figure 9A:
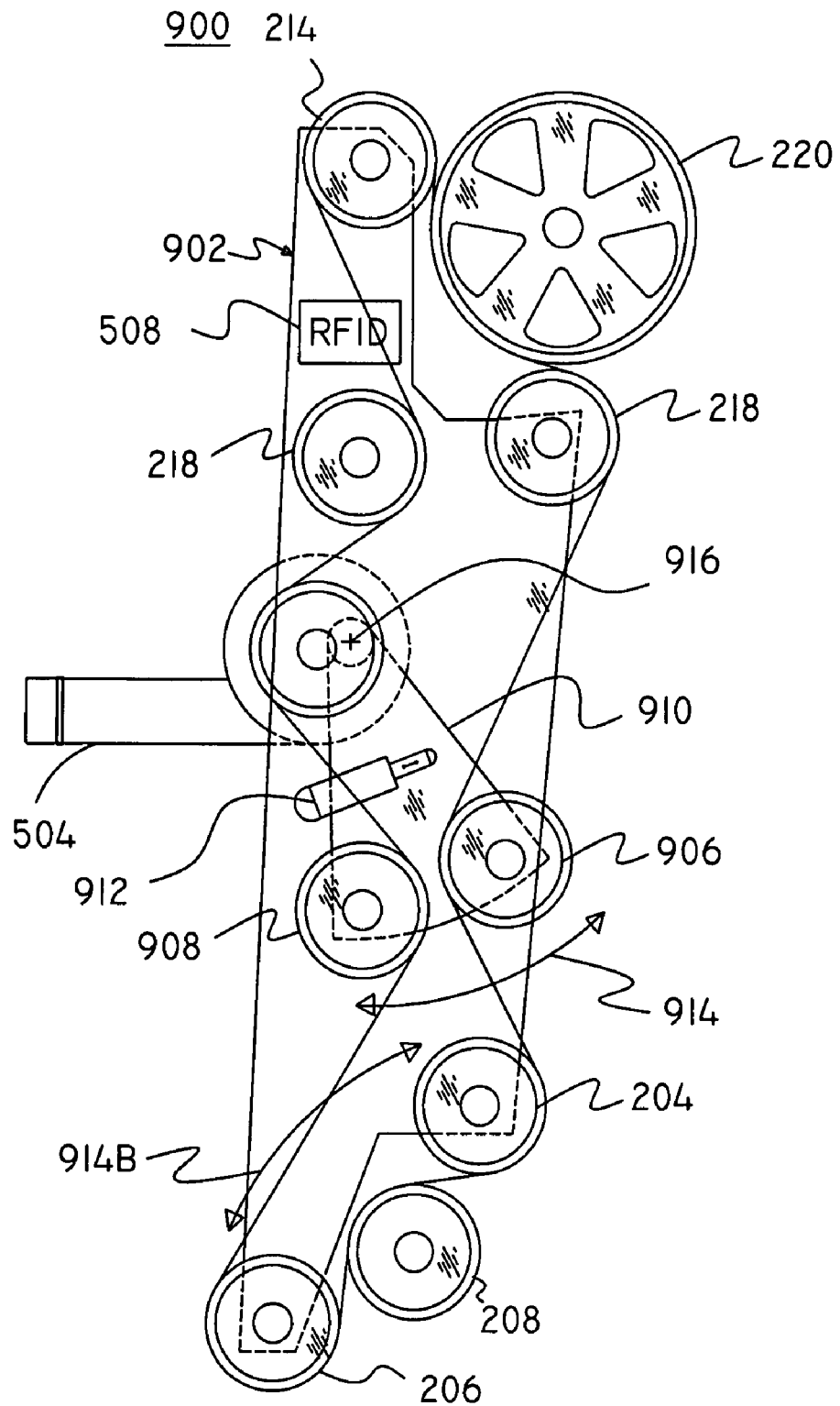
FIG. 9A is a front-view diagram illustrating the timing belt apparatus according to the present invention.

A front-view diagram illustrating the timing belt apparatus according to the present invention is shown in FIG. 9A. The timing apparatus 900 is essentially similar to the timing belt apparatus shown in FIG. 5A and includes a mounting part 902. However, a variable valve timing means is included for adjusting the timing (e.g., advancing and/or retarding) the timing of the camshaft sprocket or sprockets (and thus the camshafts coupled to respective sprockets) in relation to the crankshaft sprocket (or crankshaft). A platforms 910 and 911 (or platforms, mounts, links, etc.) is rotatably (or slidably, not shown) mounted in relation to the mounting part 902. However, it is also envisioned that the platforms 910 and 911 may be mounted to one or more other parts (e.g., a cylinder head, engine block, front cover, etc.). The variable valve timing means essentially takes up or gives slack on a portion of the timing belt 202 that lies between the camshaft sprocket (or sprockets) 220 and the crank sprocket 208 (on, for example, the tension side or the slack side relative to the camshaft sprockets or other pulley of etc., of the timing belt 202). For example, as shown, optional sprockets 906 and 908 are mounted the platforms 910 and 911, respectively, whose position is adjusted by adjusting means and tensioner 912 and 913, respectively. Accordingly, pulley 906 can be adjusted to advance or retard the timing of the camshaft sprocket 220 (and thus the camshaft) in relation to the crankshaft sprocket 208. Although the pulleys 906 and 908 are shown moving in the direction of arrow 914 about the axis 916, the pulleys 906 and 908 may also be moved in a linear fashion (not shown), about an arc, etc. The pulley 908 is optional and can be used to maintain a constant timing belt tension by giving or taking slack in an opposite manner to the pulley 906. It is also envisioned that spring biased tensioners (not shown) may also be used with or in lieu of pulley 908. The adjusting means 912 may include electrical, hydraulic, etc., activation means and/or combinations thereof. Preferably, the adjusting means 912 can include a linear acting or other type of motor, a hydraulic cylinder (e.g., controlled by solenoids, oil pressure, a controller, etc.), etc. The adjusting means 912 can be installed with the timing belt apparatus according to the present invention or may be installed separately (e.g., as an aftermarket part which, for example, can provide variable timing to an engine which originally had a conventional fixed valve timing system). Additionally, linkage means or other attachment means may be used to couple the adjusting means and/or tensioner 906 and 908 to the platform 910. Moreover, it is envisioned that other pulleys and/or sprockets may be moved to adjust the timing of the camshafts. For example, pulleys 204 and 206 may be rotated about the crankshaft pulley 208 (e.g., in the direction of arrow 914B) to adjust the timing of the camshaft sprocket 220 relative to the crankshaft sprocket 208.

Figure 9B:
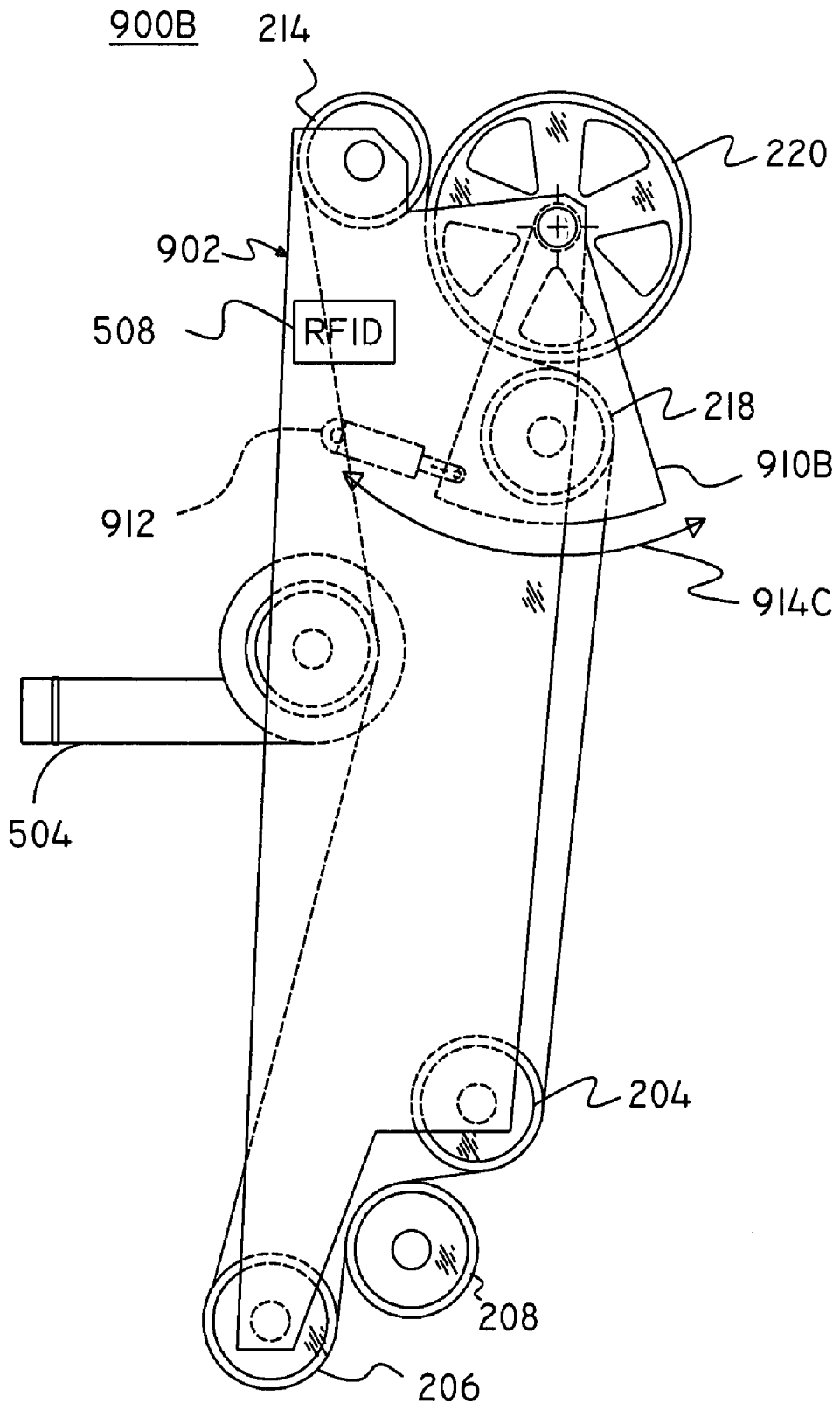
FIG. 9B is a front-view diagram illustrating the timing belt apparatus according to the present invention.

A front-view diagram illustrating the timing belt apparatus according to the present invention is shown in FIG. 9B. The timing apparatus 900B is essentially similar to the timing belt apparatus shown in FIGS. 2C and 5A and includes a mounting part 902. However, a variable valve timing means is included for adjusting the timing (e.g., advancing and/or retarding) the timing of the camshaft sprocket or sprockets 220 (and thus the camshafts coupled to respective sprockets) in relation to the crankshaft sprocket 208 (or crankshaft). The variable valve timing means includes a platform 910B (or platforms, mounts, links, etc.) which can be rotatably (or slidably, not shown) mounted in relation to the mounting part 902 about, for example, an axis which corresponds with an axis of the timing sprocket 220 as shown, such that pulley 218 and/or other pulleys can positioned (e.g., in the direction of arrow 914B) to adjust the timing. Although not shown, a slack adjuster or one or more other pulley(s), sprocket(s), etc., may be adjusted (e.g., during use) actively or passively to take up excess slack in the timing belt 202. The timing apparatus 900B includes an optional cavity or notch (not shown) in which at least part of the platform 910B is contained. The cavity, for example, may be located between first and second portions 915A and 915B (not shown). Additionally, a portion of a pump or other accessory (e.g., the water pump) may be located in the cavity and/or on one or both sides of the first or second portions.

Figure 10:
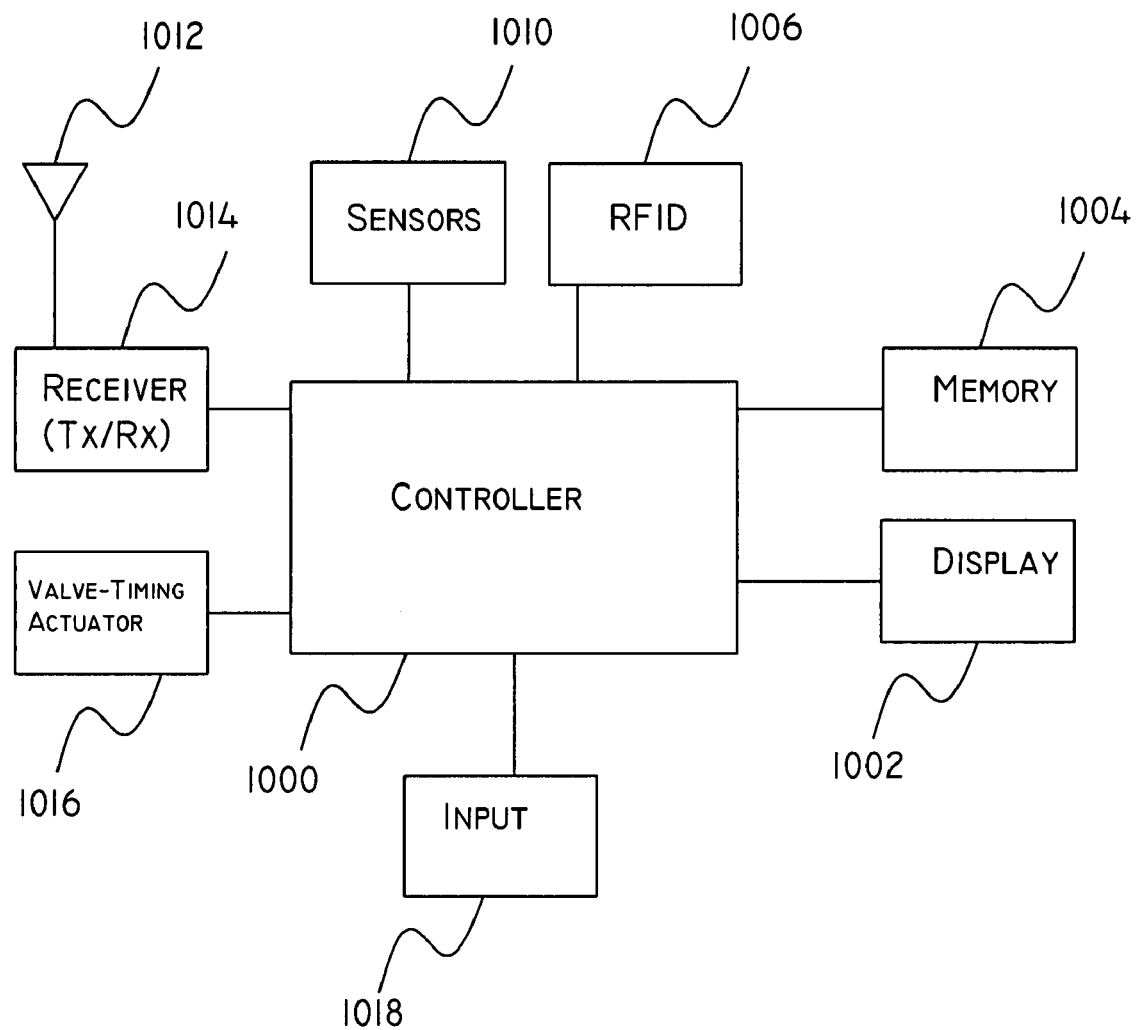
FIG. 10 is a schematic view diagram of a controller for adjusting the timing according the present invention.

A schematic view diagram of a controller for adjusting the timing according the present invention is shown in FIG. 10. A controller 1000 controls the overall operation of the system and may communicate with one or more of an input device 1018, a display 1002, a memory 1004, an identification (ID) sensor such as an RFID sensor 1006, sensors 1010, receiver (TX/RX) 1014, and/or actuator/control 1016. The sensors 1010 may include various engine control sensors such as one or more of crank and camshaft position sensors, vacuum, pressure, load, and/or angle sensors (e.g., reporting position of corresponding actuators, assemblies, engine load, etc.), battery-charge sensors, etc., as are used by conventional engine control systems. Alternatively, the controller 1000 may receive timing-related signals from an engine control computer and respond thereto accordingly. The display may include a remote display, the vehicle's display, etc., and may display requested and/or relevant information. For example, the display 1002 may display timing belt status such as recommended change interval, remaining lifespan, etc. The memory 1004 can be used to store desired information, e.g., ID numbers, date of change, operating parameters, etc. The optional RFID sensor 1006 can be used transmit/receive information using a short range communication system such as Bluetooth or other short-range communication methods. Further, communication may be established using wired means such as a wired connection, as compared to a wireless connection. The receiver 1014 may receive information such as software and other data (e.g., voice, multimedia data, maps, music, various information relating to the vehicle such as control information, etc.) using a long- or short-range communication systems. For example, the receiver 1014 may be used to receive updated software for controlling various components of the engine or may transmit information to a failure to a repair facility for expediting a repair. For example, information associated with the timing belt system according to the present invention may be transmitted to a repair center (etc.) so that adequate measures may be taken with minimum interruption to a user. Although not shown, the controller may include or be interfaced with an engine control unit (ECU— not shown and/or other vehicle computer). The input device may include a keyboard, a touch-screen display, a remote download device, a mechanics computer, etc for uploading/downloading information to/from the controller 1000. The downlink and/or uplink transmission systems can include one or more of systems such as cellular, satellite, short range (e.g., Bluetooth), etc.

Figure 11:
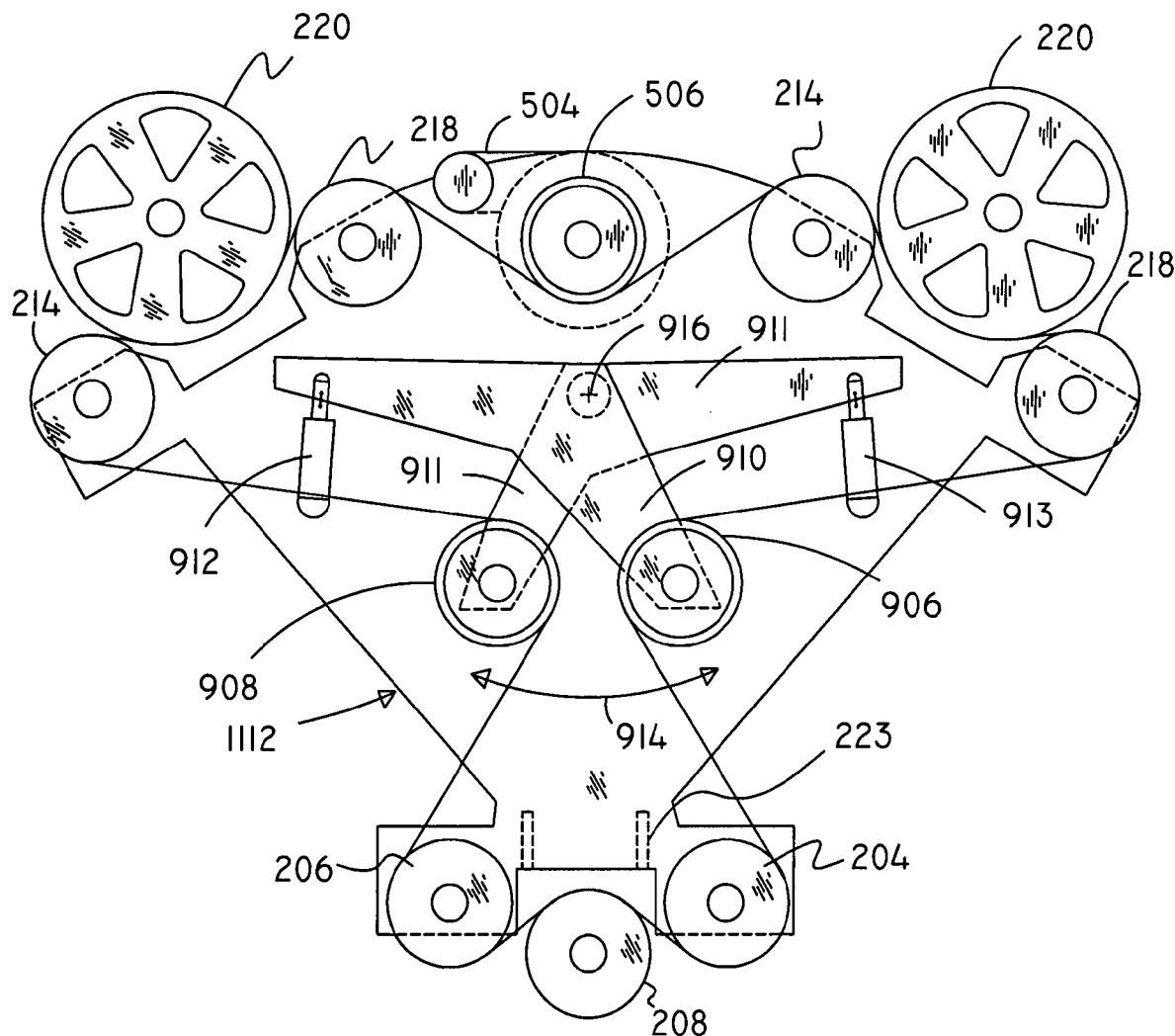
FIG. 11 is a front-view diagram illustrating the timing belt apparatus according to the present invention.

A front-view diagram illustrating the timing belt apparatus according to the present invention is shown in FIG. 11. Timing apparatus 1100 is essentially similar to the timing belt apparatus shown and described in other embodiments of the present invention. However, the timing apparatus 1100 is configured for a "V"-type engine using a single timing belt. An optional water pump 504 and variable timing system is shown. The base part 1112 may be formed from one or more portions and may include rods, links, hinges, etc. (not shown) for attaching the different portions to each other and/or simplifying installation (e.g., by allowing folding of the various components). Moreover, if desired, the timing belt may be positioned over the camshaft sprockets 220 such as is shown in FIG. 3B, in which case the base part 1112 may be much smaller such as is shown in FIGS. 2A and 3B. For example, the base part may include one or more links (e.g., struts) which allow the device according to the present invention to unfold during installation thus ensuring a small footprint and easing installation. Additionally, the one or more links may include coupling means for allowing the length of the links to be adjusted as desired.

In the preferred embodiment of the present invention, the base part is formed from a cast aluminum which includes a reinforcement ribbing (not shown). However, the base part may also be formed from a molded polymer, stamped, etc., as desired. Additionally, metal reinforcement members may also be included to reinforce the base part in desired areas. Moreover, one or more of the pulleys (or sprockets) may include a coupling means for coupling the pulley (or sprocket) to a balance shaft etc. during installation.

Moreover, in embodiments which use a variable valve timing means, the optional adjusting means 912 moves pulley 906 about axis 916. Likewise, the optional tensioner 913 (which may include an active or passive biasing means) moves pulley 908 about axis 916. The tensioner and adjusting means are shown for illustration and may also move in a liner fashion, if desired. Further, a fixed tensioning mechanism may also be provided. Moreover, in alternative embodiments, the adjusting means and/or tensioner may be placed at other locations to increase force as desired. For example, the axis 916 may be placed closer to the pulleys 906 and 908.

Further, although not shown, the timing belt of the present invention can comprise a timing chain having a plurality of links. Accordingly, a semicircular planar tensioner may be used to tension the timing chain as is know in the art. Further, if a timing chain is used, then the apparatus of the present invention may also include oil passages for delivering and/or draining lubricating oil for lubricating the timing chain.

An additional benefit of the present invention is that the base part may come in various sizes, or adjusting means, etc., to account for manufacturing or repair changes so that, for example, engines which have had their engine block surfaces and/or cylinder heads resurfaced can be accommodated by the present application. In other embodiments, other accessories may be included with the present invention so that these accessories can be swapped with a timing belt.

A novel feature of the present invention is that the timing belt does not have to be placed around and slid over an end of the crankshaft or crank sprocket, rather, the timing belt can be placed against the crankshaft sprocket and positioned using one or more pulleys or sprockets.

Thus, according to the present invention, a modular timing belt (or balance shaft belt) apparatus can simplify the installation and/or removal of timing belts (or balance belts) thus saving consumers money while benefiting vehicular manufacturer. Additionally, by using timing belts as opposed to timing chains, which are typically noisier, noise-pollution levels can be minimized. Likewise, by simplifying timing-belt (and/or water pump) replacement vehicular safety can be enhanced by reducing the likelihood of timing-belt failure. Moreover, by reducing noise levels, the present invention can enhance compliance with noise ordinances and/or regulations. Additionally, by ensuring proper timing and/or providing variable valve timing, the present invention can increase efficiency and/or reduce pollution.

The drive configuration of the present invention may also be used for driving vehicles. For example, in vehicles with belt or chain drives, such as, for example, motorcycles with belt drives, one or more of the drive or driven sprockets (e.g., the transmission output sprocket or rear-wheel sprocket) may be located on the outside of an area which is defined within the closed curve of the belt. Accordingly, the rear wheel may be removed without looping the belt over the sprocket as conventionally required. Further, a cartridge including, for example, one or more of the belt, pulleys, a base part for positioning the pulleys and the belt, a tensioner, etc., may be used to replace the belt at given intervals. Likewise, the present invention may be used to drive aircraft propellers such as, for example, as is used by ultralight aircraft. Further, by incorporating drive elements as a cartridge (e.g., including sprockets, pulleys, tensioners, etc.) proper belt tension may be automatically attained via the installation of the cartridge. For example, after installing the cartridge (e.g., including first and second pulleys, the belt, a tensioner, etc.), a pin (which, for example, holds the tensioner in a shipping and/or an installation position) may be pulled from the pretensioned tensioner, thus, allowing the tensioner to assume an operating position.

Certain additional advantages and features of this invention may be apparent to those skilled in the art upon studying the disclosure, or may be experienced by persons employing the novel apparatus and method of the present invention, chief of which are that noise and other environmental pollution can be reduced. Other advantages of the present invention include enhancing safety of vehicle occupants and increasing user convenience.

While the invention has been described with a limited number of embodiments, it will be appreciated that changes may be made without departing from the scope of the original claimed invention, and it is intended that all matter contained in the foregoing specification and drawings be taken as illustrative and not in an exclusive sense.

What is claimed is:

1. A removable cartridge assembly for an engine, comprising:
   a mounting part;
   one or more pulleys attached to said mounting part; and
   a single flexible force transmitting member comprising a single belt or chain operative to engage said two or more pulleys to form an enclosed area,
   wherein said force transmitting member is operative to be driven by a drive sprocket attached to the engine and located outside said enclosed area, said two or more pulleys situated within said enclosed area operating so as to urge said force transmitting member sufficiently against said drive sprocket to be driven thereby,
   wherein said force transmitting member is operative to drive at least one driven sprocket located outside said enclosed area, said two or more pulleys situated within said enclosed area operating so as to urge said force transmitting member sufficiently against said at least one driven sprocket to drive it thereby, and
   wherein the mounting part, the force transmitting member, and said two or more pulleys are removable from the engine as a unit with the drive sprocket remaining attached to the engine.

2. The cartridge assembly according to claim 1, wherein said mounting part is configured to support two or more other pulleys.

3. The cartridge assembly according to claim 2, wherein:
the drive sprocket is connected to a crankshaft of the engine such that a rotational position of the drive sprocket and the crankshaft are fixed relative to each other; and
wherein said one or more driven sprockets are correspondingly connected to one or more of a camshaft, an intermediate sprocket for driving a camshaft, a hydraulic pump, and a balance shaft of the engine.

4. The cartridge assembly according to claim 2, wherein said mounting part further comprises one or more of hydraulic pumps, electrical generation devices, motors, solenoids, idler pulleys, adjusting mechanisms, tensioning mechanisms, and balance shafts.

5. The cartridge assembly according to claim 1, wherein said at least one driven sprocket comprises a camshaft drive sprocket of the engine.

6. The cartridge assembly according to claim 1, further comprising:
an adjusting mechanism, controlled by a controller, which adjusts the rotational position of at least one driven sprocket relative to said drive sprocket; and
a tensioning mechanism for taking up slack in the force transmitting member.

7. The cartridge assembly according to claim 6, wherein the adjusting mechanism rotates a pulley about the axis of another pulley, the drive sprocket, at least one driven sprocket, or said two or more pulleys.

8. The cartridge assembly according to claim 2, wherein the mounting part, at least two of the pulleys, and the force transmitting member form at least part of said removable cartridge assembly that is configured to be installed or removed from the drive sprocket as a single unit.

9. The cartridge assembly according to claim 2, further comprising a radio frequency identification (RFID) transmitter connected to the mounting part for receiving or transmitting information related to said cartridge assembly.

10. The cartridge assembly according to claim 2, wherein the force transmitting member is further coupled to a sprocket or a pulley of one or more of a camshaft, a water pump, an oil pump, a propeller, a balance shaft, and an axle.

11. The cartridge assembly according to claim 1, wherein at least one of the one or more driven sprockets comprise a camshaft sprocket and are outside of the enclosed area.

12. A valve train removable cartridge assembly for an engine having a drive sprocket for transferring a force to or from one or more other sprockets via a single force transmitting member which is flexible, comprising:
first and second pulleys;
a base configured to be connected to the engine and at least one of the first and second pulleys such that the axis of the first and second pulleys are situated apart from each other; and
said force transmitting member comprising a single timing belt or timing chain adapted to form an enclosed area, wherein the one or more other sprockets comprise a camshaft sprocket or an intermediate shaft sprocket and are coupled to the force transmitting member so as to receive the force from the force transmitting member, and wherein the first and second pulleys are situated within the area and apart from each other so as to urge the force transmitting member against the drive sprocket such that the force transmitting member is coupled to the drive sprocket, the drive sprocket comprising a crankshaft sprocket of the engine which is coupled to a crankshaft of the engine and located outside of the enclosed area, wherein the base, the force transmitting member, and the first and second pulleys are removable from the engine as a unit with the drive sprocket remaining attached to the engine.

13. The valve train removable cartridge assembly according to claim 12, wherein the base, the first and second pulleys, and the force transmitting member form said removable cartridge assembly which enables the installation or removal of the force transmitting member from the engine and the drive sprocket.

14. The valve train removable cartridge assembly according to claim 12, wherein the force transmitting member comprises a single timing belt or a chain, the drive sprocket comprises a crankshaft sprocket which is coupled a crankshaft of the engine, and the one or more other sprockets further comprise one or more camshaft sprockets, intermediate shaft sprockets, balance shaft sprockets, and hydraulic pump sprockets, which are coupled to the force transmitting member.

15. The valve train removable cartridge assembly according to claim 12, wherein one or more of the pulleys comprises a sprocket.

16. The valve train removable cartridge assembly according to claim 12, wherein the base further comprises one or more of pumps, electrical generation devices, motors, solenoids, idler pulleys, tensioning mechanisms, adjusting mechanisms, and balance shafts, connected to the base, wherein the adjusting mechanisms controllably adjusts the rotational position of one or more of the other sprockets relative to the drive sprocket.

17. The valve train removable cartridge assembly according to claim 13, wherein the cartridge assembly configured to be coupled to the engine and further comprises one or more of a water pump, a tensioner, and an idler pulley.

18. A method for configuring a flexible force transmitting member in a removable cartridge assembly for an engine, the method comprising:
forming, using said flexible force transmitting member comprising a single belt or chain, a closed curve defining an enclosed area;
locating first and second pulleys apart from each other and about a drive sprocket external to said cartridge assembly;
routing the flexible force transmitting member about the first and second pulleys, at least one camshaft pulley, and the drive sprocket which comprises a crankshaft sprocket, such that the first and second pulleys are located within the enclosed area and the drive sprocket is located outside of the enclosed area, wherein the cartridge assembly is removable from the engine as a unit with the drive sprocket remaining attached to the engine.

19. The method according to claim 18, further comprising forming said removable cartridge assembly comprising the first and second pulleys, a base part, and the force transmitting member, the base part structured and arranged configured to be connected to the engine and to support at least one of the first and second pulleys.

20. A method for configuring a flexible force transmitting member in a removable cartridge assembly for an engine, the method comprising:
forming, using said flexible force transmitting member comprising a single belt or chain, a closed curve defining an enclosed area;
locating first and second pulleys apart from each other and on either side of a drive sprocket external to said cartridge assembly;

routing the flexible force transmitting member about the first and second pulleys, at least one camshaft pulley, and the drive sprocket which comprises a crankshaft sprocket, such that the first and second pulleys are located within the enclosed area and the drive sprocket is located outside of the enclosed area;

forming said removable cartridge assembly comprising the first and second pulleys, a base part, and the force transmitting member, the base part configured to be connected to the engine and to support the first and second pulleys; and installing or removing the cartridge assembly from the engine, so that the force transmitting member is correspondingly installed or removed from the drive sprocket, wherein the engine is an internal combustion engine and the drive sprocket is an engine output shaft sprocket.

21. The cartridge assembly according to claim 12, wherein the one or more other sprockets are situated outside of the enclosed area.

22. A modular drive apparatus, comprising:
a cartridge comprising:
    a flexible force transmitting member forming a closed curve enclosing an area;
    a mounting part configured to be attached to an engine having a drive sprocket mounted thereto, the drive sprocket for driving said force transmitting member; and
    first and second pulleys attached to said mounting part;
    and wherein said mounting part is configured such that said first and second pulleys are situated at least partially within said area and on opposing sides of said drive sprocket so as to urge the force transmitting member against said drive sprocket which is located outside of said area,
    wherein the mounting part, the force transmitting member, and said first and second pulleys are removable from the engine as a unit with the drive sprocket remaining attached to the engine.

23. An apparatus for driving a gear train of an internal combustion engine, comprising:
    a cartridge assembly configured to be attached to, or removed from, the engine as a unit, the cartridge assembly comprising:
    a flexible force transmitting member forming a closed curve defining an area;
    two or more pulleys situated within said area;
    and a base configured to be attached to the two or more pulleys such that the two or more pulleys are situated within said area and apart from each other so as to urge the force transmitting member against the drive sprocket of the vehicular engine,
    wherein the drive sprocket is located outside of said area, and
    wherein the base, the force transmitting member, and said two or more pulleys are removable from the engine as a unit with the drive sprocket remaining attached to the engine.

24. The apparatus of claim 23, wherein the cartridge assembly is configured to be attached to, or removed from, the engine in a direction which is substantially perpendicular to an axis of the drive sprocket.

25. A cartridge apparatus for driving a gear train of an engine having a crankshaft drive sprocket which drives an endless force transmitting member defining a closed area, the cartridge apparatus comprising:
    a base portion comprising: a water pump, and first, second, and third pulleys, the first pulley comprising a water pump pulley to drive the water pump, the base portion being configured to be attached to the engine such that the second and third pulleys are situated within said closed area and apart from each other so as to urge the endless force transmitting member against the drive sprocket of the engine, and wherein the cartridge apparatus is configured to be attached to, or removed from, the engine as a unit with the drive sprocket remaining attached to the engine.

26. The cartridge apparatus of claim 25, wherein the base portion further defines at least part of a fluid passage.

27. The cartridge apparatus of claim 25, wherein the drive sprocket of the engine is located outside the closed area defined by the endless force transmitting member.

28. A removable cartridge assembly for an engine, comprising:
    a mounting part;
    two or more pulleys attached to said mounting part; and
    a single flexible force transmitting member comprising a single belt or chain operative to engage said two or more pulleys to form an enclosed area,
    wherein said force transmitting member is operative to be driven by a drive sprocket attached to the engine and located outside said enclosed area, said two or more pulleys situated within said enclosed area operating so as to urge said force transmitting member sufficiently against said drive sprocket to be driven thereby,
    wherein said force transmitting member is operative to drive at least one driven sprocket located outside said enclosed area, said two or more pulleys situated within said enclosed area operating so as to urge said force transmitting member sufficiently against said at least one driven sprocket to drive it thereby, and
    wherein the mounting part is configured such that installing or removing the mounting part from the engine, causes the force transmitting member to be correspondingly installed or removed from the drive sprocket, wherein the engine is an internal combustion engine and the drive sprocket is an engine output shaft sprocket.

* * * * *